US012359804B2

(12) United States Patent
Iyer et al.

(10) Patent No.: US 12,359,804 B2
(45) Date of Patent: Jul. 15, 2025

(54) BURNER SYSTEM WITH DISCRETE TRANSVERSE FLAME STABILIZERS

(71) Applicant: ClearSign Technologies Corporation, Tulsa, OK (US)

(72) Inventors: Venkatesh Iyer, Bothell, WA (US); Colin James Deller, Tulsa, OK (US); Jeff Lewallen, Broken Arrow, OK (US); Donald Kendrick, Bellevue, WA (US); James K. Dansie, Seattle, WA (US); Douglas W. Karkow, Mount Vernon, IA (US)

(73) Assignee: ClearSign Technologies Corporation, Tulsa, OK (US)

( * ) Notice: Subject to any disclaimer, the term of this patent is extended or adjusted under 35 U.S.C. 154(b) by 376 days.

(21) Appl. No.: 17/929,670

(22) Filed: Sep. 2, 2022

(65) Prior Publication Data

US 2023/0072921 A1 Mar. 9, 2023

Related U.S. Application Data

(63) Continuation-in-part of application No. 16/166,509, filed on Oct. 22, 2018, now Pat. No. 11,435,143,
(Continued)

(51) Int. Cl.
*F23D 14/22* (2006.01)
*F23D 14/58* (2006.01)
(Continued)

(52) U.S. Cl.
CPC ............. *F23D 14/22* (2013.01); *F23D 14/58* (2013.01); *F23D 14/70* (2013.01);
(Continued)

(58) Field of Classification Search
CPC ........ F23D 14/14; F23D 14/145; F23D 14/16; F23D 14/26; F27D 99/0033
(Continued)

(56) References Cited

U.S. PATENT DOCUMENTS 3,277,948 A 10/1966 Best
5,049,065 A * 9/1991 Smith ..................... F23D 14/46 431/328
(Continued)

FOREIGN PATENT DOCUMENTS

GB 2290608 A 1/1996
JP 5617531 B2 9/2014
(Continued)

OTHER PUBLICATIONS

International Search Report and Written Opinion mailed Sep. 1, 2017 for PCT International Patent Application No. PCT/US2017/030252 filed Apr. 28, 2017, 11 pages.
(Continued)

*Primary Examiner* — Vivek K Shirsat
(74) *Attorney, Agent, or Firm* — Crowe & Dunlevy, P.C.

(57) ABSTRACT

A combustion system includes a fuel and oxidant source and a flame holder. The flame holder includes a plurality of discrete slats arranged in parallel defining combustion channels between adjacent slats. Pairs of adjacent slats may be oriented to operate substantially as a V-gutter. The fuel and oxidant source outputs fuel and oxidant into the combustion channels. The flame holder holds a combustion reaction of the fuel and oxidant in the combustion channels.

44 Claims, 17 Drawing Sheets

Related U.S. Application Data which is a continuation of application No. PCT/US2017/030252, filed on Apr. 28, 2017, application No. 17/929,670, filed on Sep. 2, 2022 is a continuation-in-part of application No. PCT/US2022/071145, filed on Mar. 14, 2022.

(60) Provisional application No. 63/160,682, filed on Mar. 12, 2021, provisional application No. 63/178,194, filed on Apr. 22, 2021, provisional application No. 62/329,525, filed on Apr. 29, 2016.

(51) Int. Cl.
*F23D 14/70* (2006.01)
*F27D 99/00* (2010.01)

(52) U.S. Cl.
CPC .. *F27D 99/0033* (2013.01); *F23C 2900/9901* (2013.01); *F23D 2203/106* (2013.01); *F23D 2212/10* (2013.01)

(58) Field of Classification Search
USPC ..................................... 431/6, 328, 350, 354
See application file for complete search history.

(56) References Cited

U.S. PATENT DOCUMENTS

| | | | | | |
|---|---|---|---|---|---|
| 5,685,708 | A * | 11/1997 | Palmer-Jones | F23D 14/583 431/114 |
| 5,813,849 | A | 9/1998 | Schwartz et al. | |
| 5,993,196 | A | 11/1999 | Young et al. | |
| 6,575,536 | B2 | 6/2003 | Chen | |
| 6,575,736 | B1 * | 6/2003 | Aust | F23D 14/145 431/328 |
| 2008/0206693 | A1 | 8/2008 | Lifshits et al. | |
| 2016/0046524 | A1 | 2/2016 | Coloninno et al. | |
| 2020/0224873 | A1 | 7/2020 | Karkow et al. | |

FOREIGN PATENT DOCUMENTS

| | | | |
|---|---|---|---|
| WO | 2015/054323 | A1 | 4/2015 |
| WO | 2015/123701 | A1 | 8/2015 |
| WO | 2016/007564 | A1 | 1/2016 |

OTHER PUBLICATIONS

International Search Report and Written Opinion mailed Aug. 31, 2022 for PCT International Patent Application No. PCT/US2022/071145 filed Mar. 14, 2022, 16 pages.

* cited by examiner

BURNER SYSTEM WITH DISCRETE TRANSVERSE FLAME STABILIZERS

CROSS REFERENCE TO RELATED APPLICATIONS

The present application is a Continuation in Part of U.S. patent application Ser. No. 16/166,509, entitled "BURNER SYSTEM WITH DISCRETE TRANSVERSE FLAME STABILIZERS," filed Oct. 22, 2018, now pending, which itself is a U.S. Continuation Application which claims priority benefit under 35 U.S.C. § 120 of co-pending International Patent Application No. PCT/US2017/030252, entitled "BURNER SYSTEM WITH DISCRETE TRANSVERSE FLAME STABILIZERS," filed Apr. 28, 2017; which application claims priority benefit from U.S. Provisional Patent Application No. 62/329,525, entitled "BURNER SYSTEM WITH DISCRETE TRANSVERSE FLAME STABILIZERS," filed Apr. 29, 2016; each of which, to the extent not inconsistent with the disclosure herein, is incorporated by reference.

The present application is also a Continuation in Part which claims priority benefit under 35 U.S.C. § 120 of co-pending International Patent Application No. PCT/US2022/071145 titled "PROCESS BURNER WITH DISTAL FLAME HOLDER," filed Mar. 14, 2022, which application claims priority benefit from U.S. Provisional Patent Application No. 63/160,682 titled "BURNER SYSTEM WITH PRE-MIXED DISTAL PILOT," filed Mar. 12, 2021 and U.S. Provisional Patent Application No. 63/178,194 titled "PROCESS BURNER WITH DISTAL FLAME HOLDER," filed extent not inconsistent with the disclosure herein, is incorporated by reference.

SUMMARY

A combustion system including the flame holder may include a fuel and oxidant source configured to output fuel and oxidant; and a flame holder. The flame holder may include a plurality of slats arranged to be longitudinally parallel with each other, respective pairs of the slats each forming a v-shaped channel. Each slat may include a first edge proximal to the fuel and oxidant source and a second edge distal from the fuel and oxidant source. The combustion system may further include a support structure holding the slats. A plurality of combustion channels may be defined by the pairs of slats, each combustion channel disposed between respective adjacent pairs of slats. Each combustion channel may have a tapered cross-sectional shape defined by a wider width corresponding to a distance between the respective first edges of adjacent pairs of slats and a narrower width corresponding to a distance between the respective second edges of the adjacent pairs of slats. Each combustion channel may have a length corresponding to a distance between a plane defined by the first edges and a plane defined by the second edges of the plurality of slats. The length may be at least five times the narrower width. The flame holder, may be positioned to receive the fuel and oxidant into the combustion channels and to collectively hold a combustion reaction of the fuel and oxidant primarily within the combustion channels.

According to an embodiment, the length of each combustion channel is at least 5 times the narrower width.

According to an embodiment, a method includes outputting fuel and oxidant from a fuel and oxidant source and supporting a plurality of slats of a flame holder arranged longitudinally parallel to each other in pairs each forming v-shaped channel. Each slat has a first edge proximal to the fuel and oxidant source and a second edge distal from the fuel and oxidant source. The method further includes receiving the fuel and oxidant into a plurality of combustion channels each disposed between respective adjacent v-shaped channels formed by the pairs of slats. Each combustion channel has a tapered cross-sectional shape defined by a wider width corresponding to a distance between the respective first edges of adjacent pairs of slats and a narrower width corresponding to a distance between the respective second edges of the adjacent pairs of slats. The combustion channel has a length corresponding to a distance between a plane defined by the first edges and a plane defined by the second edges of the plurality of slats, the length being at least five times the narrower width. The method further includes holding a combustion reaction of the fuel and oxidant primarily within the combustion channels.

DETAILED DESCRIPTION

Figure 1:
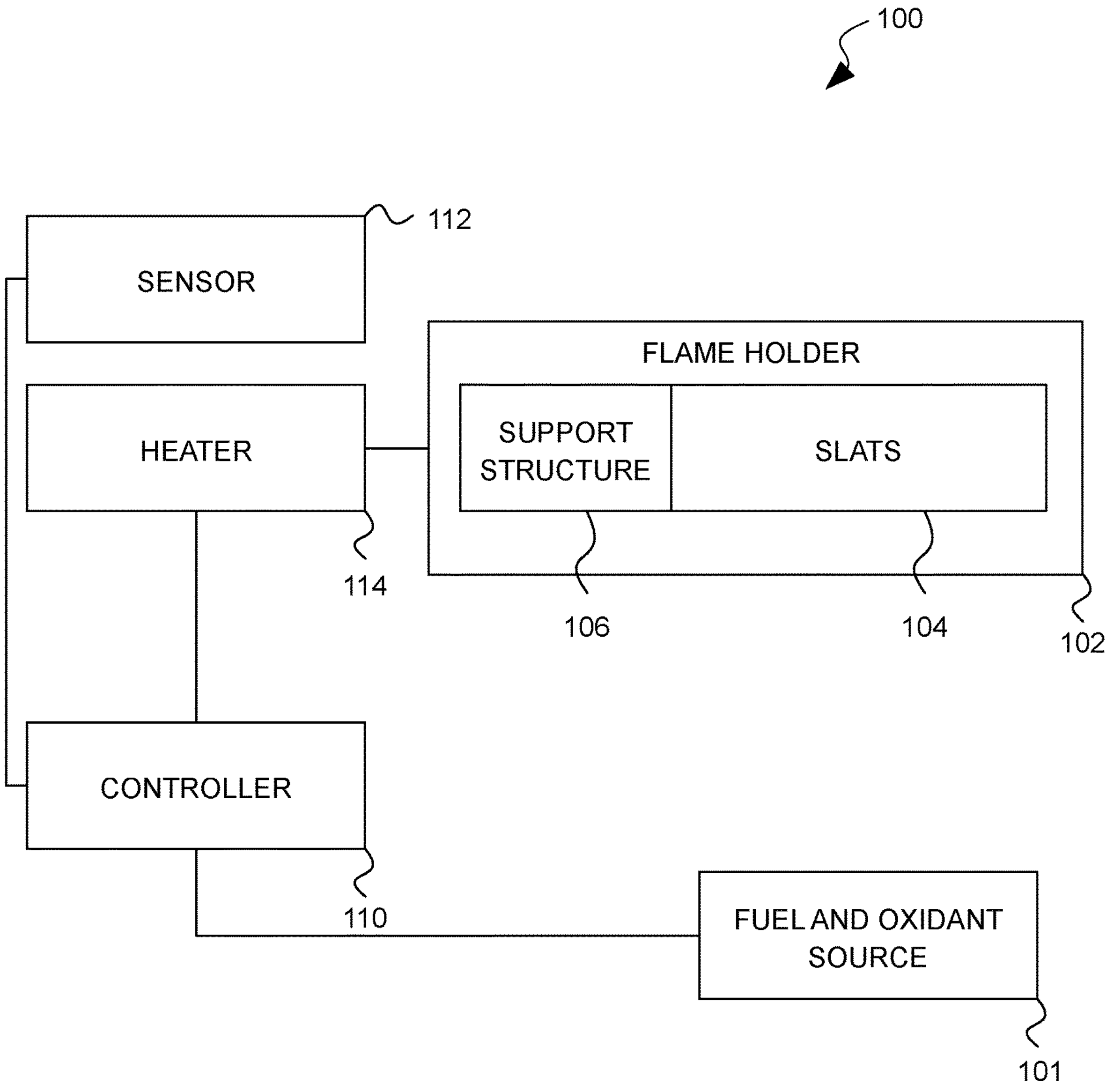
FIG. 1 is a block diagram of a combustion system including a flame holder, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a block diagram of a combustion system 100, according to an embodiment. The combustion system 100 includes a fuel and oxidant source 101 and a flame holder 102. The flame holder 102 includes a plurality of slats 104 and a support structure 106. The combustion system 100 further includes a controller 110, a sensor 112, and a heater 114.

The fuel and oxidant source 101 is configured to output fuel and oxidant onto the flame holder 102. The flame holder 102 sustains a combustion reaction of the fuel and oxidant primarily within the flame holder 102.

According to an embodiment, the slats 104 are arranged in an array extending in a direction transverse to a direction of output of the fuel and oxidant from the fuel and oxidant source 101. The slats 104 are discrete slats positioned in parallel with each other. In particular, each slat 104 is separated from the next slat 104 by a selected distance. The arrangement of slats 104 in parallel defines a plurality of combustion channels between the slats 104. Each combustion channel has a width that is the distance between adjacent slats 104.

The fuel and oxidant source 101 outputs the fuel and oxidant toward the flame holder 102. The fuel and oxidant enters into the combustion channels between the slats 104. The flame holder 102 sustains a combustion reaction of the fuel and oxidant primarily within the combustion channels between the slats 104.

According to an embodiment, the height of the combustion channels corresponds to the height of the slats 104 in a direction along an axis of travel of the fuel and oxidant from the fuel and oxidant source 101. According to an embodiment, the height of the combustion channels is at least five times the width of the combustion channels.

The support structure 106 holds the slats 104 in a selected position relative to the fuel and oxidant source 101. Additionally, the support structure 106 holds the slats 104 in position relative to each other. Thus, the support structure 106 holds the slats 104 in an array in which the slats 104 extend parallel to each other and define the combustion channels between adjacent slats 104.

According to an embodiment, the flame holder 102 is configured to hold a majority of the combustion reaction of the fuel and oxidant within the combustion channels. For example, on a steady-state basis, more than half the molecules of fuel output by the fuel and oxidant source 101 may be converted to combustion products between the input face and the output face of the flame holder 102. According to an alternative interpretation, more than half of the heat output by the combustion reaction may be output between the input face and the output face of the flame holder 102. Under nominal operating conditions, the combustion channels can be configured to collectively hold at least 80% of the combustion reaction between the input face and the output face of the flame holder 102. In some experiments, the inventors produced a combustion reaction that was apparently wholly contained in the combustion channels between the input face and the output face of the flame holder 102. According to an alternative interpretation, the flame holder 102 can support combustion between the input face and output face when combustion is "time-averaged." For example, during transients, such as before the flame holder 102 is fully heated, or if too high a (cooling) load is placed on the system, the combustion may travel somewhat downstream from the output face of the flame holder 102.

While a "flame" is described in a manner intended for ease of description, it should be understood that in some instances, no visible flame is present. Combustion occurs primarily within the combustion channels, but the "glow" of combustion heat is dominated by a visible glow of the flame holder 102 itself. In other instances, the inventors have noted transient "huffing" wherein a visible flame momentarily ignites in a region lying between the input face of the flame holder 102 and the fuel and oxidant source 101, within a dilution region. Such transient huffing is generally short in duration such that, on a time-averaged basis, a majority of combustion occurs within the combustion channels of the flame holder 102, between the input face and the output face. In still other instances, the inventors have noted apparent combustion occurring above the output face of the flame holder 102, but still a majority of combustion occurred within the flame holder 102 as evidenced by the continued visible glow (a visible wavelength tail of blackbody radiation) from the flame holder 102.

The flame holder 102 can be configured to receive heat from the combustion reaction and to output a portion of the received heat as thermal radiation to heat-receiving structures (e.g., furnace walls and/or radiant section working fluid tubes) in or adjacent to the combustion volume. As used herein, terms such as thermal radiation, infrared radiation, radiant heat, heat radiation, etc. are to be construed as being substantially synonymous, unless further definition is provided. Specifically, such terms refer to blackbody radiation of electromagnetic energy, primarily in infrared wavelengths.

According to an embodiment, the slats 104 include a refractory material. The refractory material can include one or more of Mullite, Cordierite, silicon carbide, zirconia, fused quartz, and fiber reinforced cementatious material.

According to an embodiment, the support structure 106 includes a refractory material. The refractory material can include one or more of Mullite, Cordierite, silicon carbide, zirconia, fused quartz, and fiber reinforced cementatious material.

According to an embodiment, the support structure 106 includes a rotation device configured to rotate the slats 104 to change the dimensions of the combustion channels or to close off the combustion channels altogether.

While FIG. 1 and the related description have described a flame holder 102 including a plurality of slats 104, the flame holder 102 can include elongated members other than slats 104.

Figure 2A:
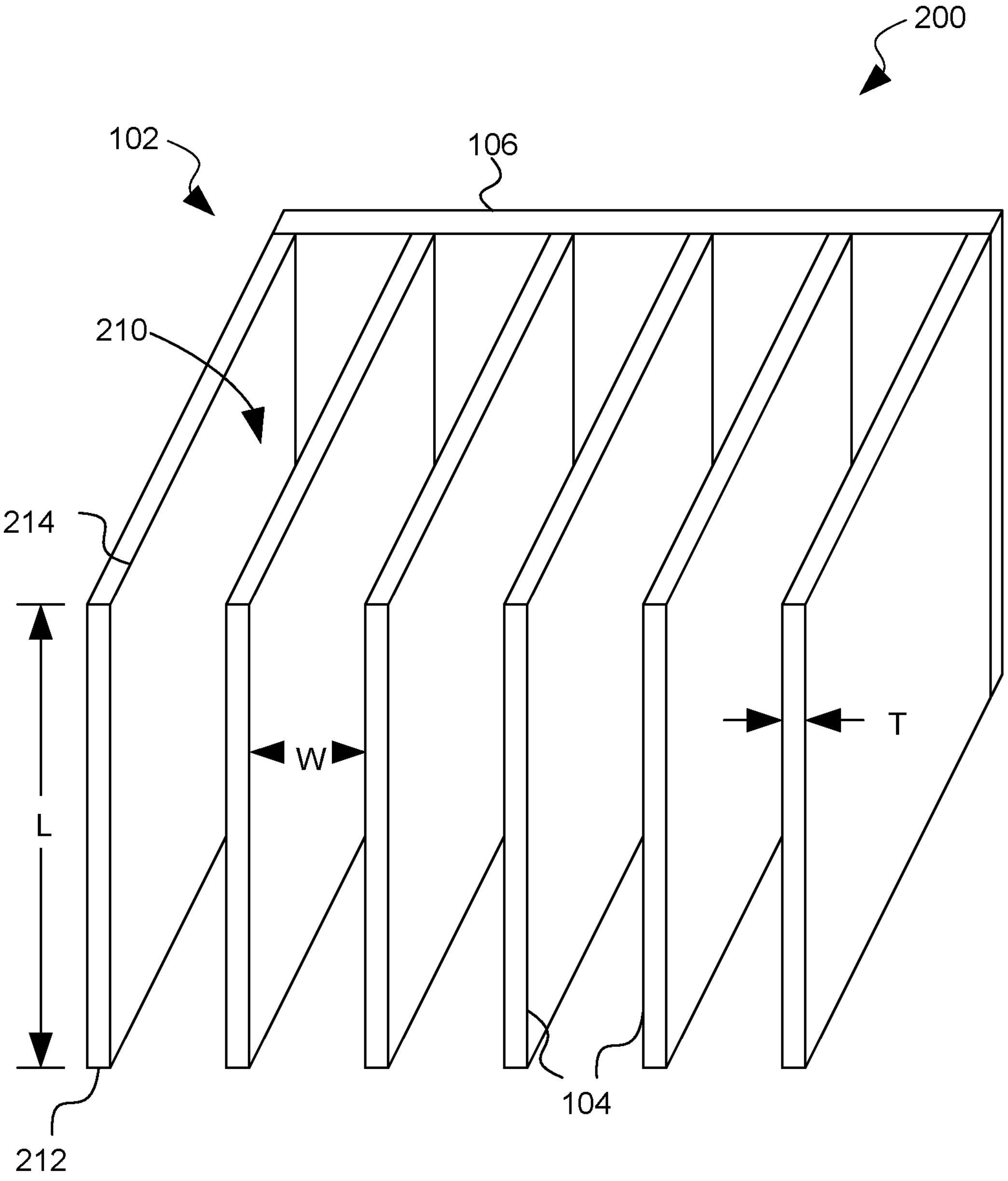
FIG. 2A is a perspective view of a flame holder including a plurality of slats, according to an embodiment.

FIG. 2A is a perspective view of a combustion system 200 including a flame holder 102, according to an embodiment. The flame holder 102 includes a plurality of discrete slats 104 positioned in parallel with each other and supported by the support structure 106.

According to an embodiment, the slats 104 are arranged in parallel with each other. Each slat 104 is separated from adjacent slats 104 by distance W. The arrangement of the slats 104 defines a plurality of combustion channels 210 between adjacent slats 104. The width W of each combustion channel 210 is the distance between adjacent slats 104. The height L of each combustion channel 210 corresponds to a height of the slats 104. Each slat 104 has a thickness T.

Though the fuel and oxidant source 101 is not pictured in FIG. 2A, the fuel and oxidant source 101 is positioned below the flame holder 102 in the embodiment of FIG. 2A. The fuel and oxidant source 101 outputs fuel and oxidant onto the flame holder 102. The fuel and oxidant enters into the combustion channels 210. The flame holder 102 sustains a combustion reaction of the fuel and oxidant within the combustion channels 210.

According to an embodiment, each slat 104 can include a first edge 212 and a second edge 214. The first edge 212 is positioned proximal to the fuel and oxidant source 101. The second edge 214 is positioned distal from the fuel and oxidant source 101.

According to an embodiment, the support structure 106 includes a second portion not shown in FIG. 2A. In particular, the support structure 106 may include a second portion coupled opposite from the portion shown in FIG. 2A, at opposite ends of each slat 104 relative to the portion of the support structure 106 shown in FIG. 2A.

Though FIG. 2A discloses that the combustion channels 210 each have the same width W and height H, according to an embodiment each combustion channel 210 can have a different width W and a different length L. Thus, the slats 104 can be separated by various distances and can have differing dimensions such that the length L of combustion channels 210 can vary.

According to an embodiment, the flame holder 102 can be differently oriented than has been shown in FIG. 1 and FIG. 2A. For example, the fuel and oxidant source 101 can be positioned laterally from the flame holder 102 and oriented such that the fuel and oxidant source 101 outputs fuel and oxidant horizontally and the flame holder 102 would be at an orientation rotated 90° from that shown in FIG. 2A such that the fuel and oxidant can enter into the channels 210. Thus, the length L would not correspond to a vertical distance, but a horizontal distance.

Figure 2B:
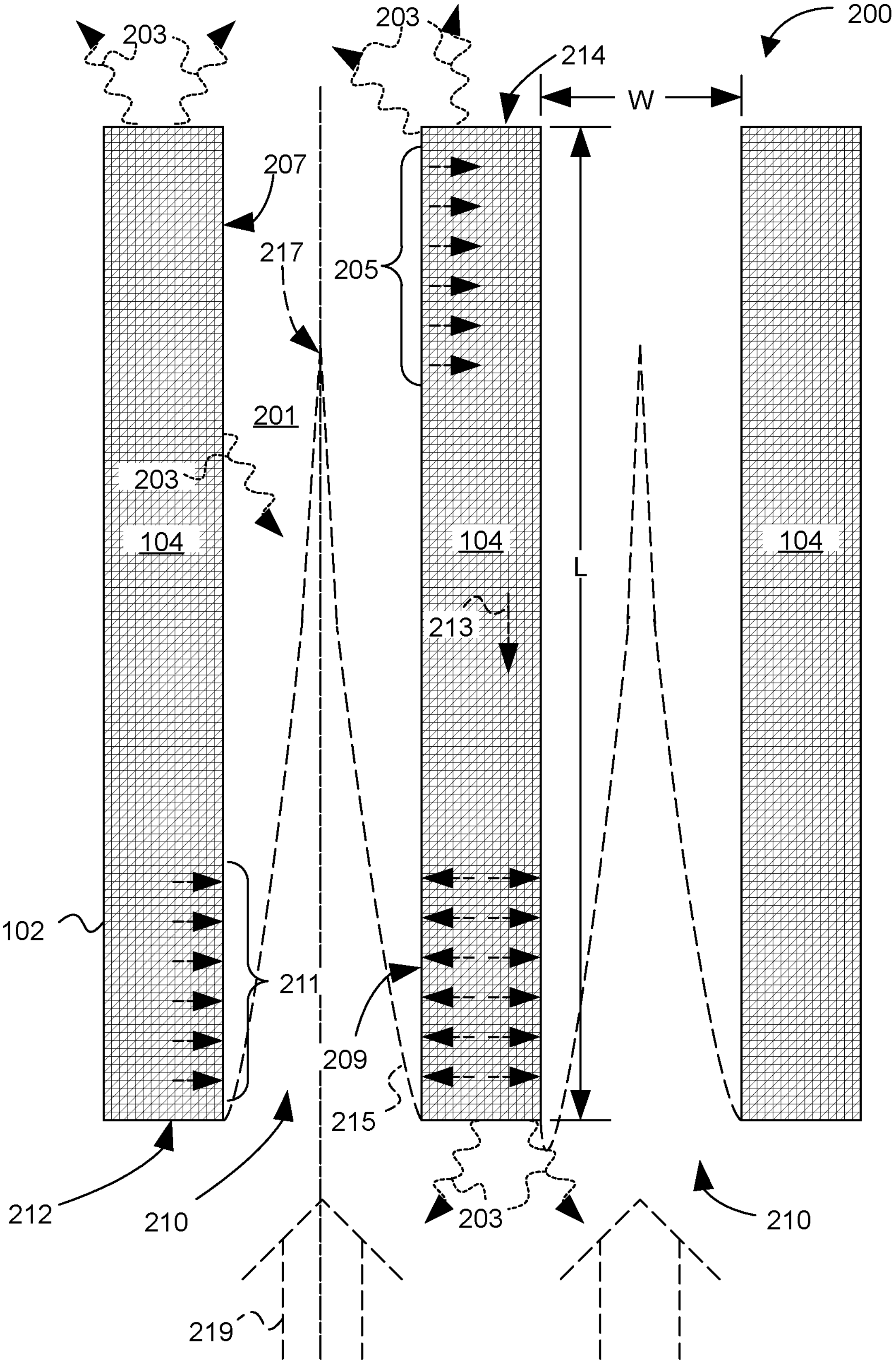
FIG. 2B is a cross-sectional view of the slats of FIG. 2A, according to an embodiment.

FIG. 2B is an enlarged cross sectional view of a portion of the flame holder 102, according to an embodiment. The flame holder 102 is aligned to receive fuel and oxidant in a fuel and oxidant mixture 219 from the fuel and oxidant source 101. The flame holder 102 sustains a combustion reaction 201 of the fuel and oxidant within the combustion channels 210, thereby generating heat, a portion of which is received by the flame holder 102. The flame holder 102 outputs a portion of the received heat to the fuel and oxidant mixture 219 received at the first edges 212 of the slats 104. The slats 104 may receive heat from the (exothermic) combustion reaction 201 at least in heat receiving regions 205 of slat sidewalls 207. Experimental evidence has suggested to the inventors that the position of the heat receiving regions 205, or at least the position corresponding to a maximum rate of receipt of heat, can vary along the length of the slat sidewalls 207. In some experiments, the location of maximum receipt of heat was apparently between ⅓ and ½ of the distance from the first edge 212 to the second edge 214 (i.e., somewhat nearer to the first edge 212 than to the second edge 214). The inventors contemplate that the heat receiving regions 205 may lie nearer to the second edge 214 of the flame holder 102 under other conditions. Most probably, there is no clearly defined edge of the heat receiving regions 205 (or for that matter, the heat output regions 211, described below). For ease of understanding, the heat receiving regions 205 and the heat output regions 211 will be described as particular regions 205, 211.

The slats 104 can be characterized by a heat capacity. The slats 104 may hold heat from the combustion reaction 201 in an amount corresponding to the heat capacity times temperature rise, and transfer the heat from the heat receiving regions 205 to heat output regions 211 of the slat sidewalls 207. Generally, the heat output regions 211 are nearer to the first edge 212 than are the heat receiving regions 205. According to one interpretation, the slats 104 can transfer heat from the heat receiving regions 205 to the heat output regions 211 via thermal radiation, depicted graphically as 203. According to another interpretation, the slats 104 can transfer heat from the heat receiving regions 205 to the heat output regions 211 via heat conduction along heat conduction paths 213. The inventors contemplate that both radiation and conduction heat transfer mechanisms may be operative in transferring heat from the heat receiving regions 205 to the heat output regions 211. In this way, the flame holder 102 may act as a heat source to maintain the combustion reaction 201, even under conditions where a combustion reaction 201 would not be stable when supported from a conventional flame holder.

The inventors believe that the flame holder 102 causes the combustion reaction 201 to occur within thermal boundary layers 215 formed adjacent to walls 209 of the combustion channels 210. As the relatively cool fuel and oxidant mixture 219 approaches the first edge 212, the flow is split into portions that respectively travel through individual combustion channels 210. The hot slats 104 transfer heat to the fluid, notably within thermal boundary layers 215 that progressively thicken as more and more heat is transferred to the incoming fuel and oxidant mixture 219. After reaching a combustion temperature (e.g., the auto-ignition temperature of the fuel), the reactants continue to flow while a chemical ignition delay time elapses, over which time the combustion reaction 201 occurs. Accordingly, the combustion reaction 201 is shown as occurring within the thermal boundary layers 215. As flow progresses, the thermal boundary layers 215 merge at a merger point 217. Ideally, the merger point 217 lies between the first edge 212 and second edge 214 that defines the ends of the combustion channels 210. At some point, the combustion reaction 201 causes the flowing gas (and plasma) to output more heat to the slats 104 than it receives from the slats 104. The heat is received at the heat receiving region 205, is held by the slats 104, and is transported to the heat output region 211 nearer to the first edge 212, where the heat recycles into the cool reactants (and any included diluent) to raise them to the combustion temperature.

According to an embodiment, a pilot flame is supported upstream, downstream, or impinging upon the slats to hold the combustion reaction within the combustion channels.

In an embodiment, the plurality of combustion channels 210 are each characterized by a length L defined as a reaction fluid propagation path length from the first edge 212 to the second edge 214 of one of the slats 104. The reaction fluid includes the fuel and oxidant mixture 219 (optionally including nitrogen, flue gas, and/or other "non-reactive" species), reaction intermediates (including transition states in a plasma that characterizes the combustion reaction 201), and reaction products.

The plurality of combustion channels 210 can be each characterized by a transverse width W between opposing slat sidewalls 207. The inventors have found that stable combustion can be maintained in the flame holder 102 if the length L of each combustion channel 210 is at least four times the transverse dimension W of the combustion channel 210. In other embodiments, the length L can be greater than six times the transverse dimension W. For example, experiments have been run where L is at least eight, at least twelve, at least sixteen, and at least twenty-four times the transverse dimension W. Preferably, the length L is sufficiently long for thermal boundary layers 215 formed adjacent to the slat sidewalls 207 in a reaction fluid flowing through the combustion channels 210 to converge at merger points 217 within the combustion channels 210 between the first edge 212 and the second edge 214 of the flame holder 102. In experiments, the inventors have found L/W ratios above 5 work well, and that ratios between 12 and 38 work particularly well (i.e., produce low NOx, produce low CO, and maintain stable combustion).

The slats 104 can be configured to convey heat between adjacent combustion channels 210. The heat conveyed between adjacent combustion channels 210 can be selected to cause heat output from the combustion reaction portion 201 in a first combustion channel 210 to supply heat to stabilize a combustion reaction portion 201 in an adjacent combustion channel 210.

Referring especially to FIG. 1, the fuel and oxidant source 101 can further include a fuel nozzle, configured to output fuel, and an oxidant source configured to output a fluid including the oxidant. For example, the fuel nozzle can be configured to output pure fuel. The oxidant source can be configured to output combustion air carrying oxygen, and optionally, flue gas.

The flame holder 102 can be held by a flame holder support structure 106 configured to hold the flame holder 102 at a dilution distance $D_D$ away from the fuel nozzle. The fuel nozzle can be configured to emit a fuel jet selected to entrain the oxidant to form the fuel and oxidant mixture 219 as the fuel jet and oxidant travel along a path to the flame holder 102 through the dilution distance $D_D$ between the fuel nozzle and the flame holder 102. Additionally, or alternatively (particularly when a blower is used to deliver oxidant contained in combustion air), the oxidant or combustion air source can be configured to entrain the fuel and the fuel and oxidant travel through the dilution distance $D_D$. In some embodiments, a flue gas recirculation path can be provided. Additionally, or alternatively, the fuel nozzle can be configured to emit a fuel jet selected to entrain the oxidant and to entrain flue gas as the fuel jet travels through the dilution distance $D_D$ between the fuel nozzle and the first edge 212 of the flame holder 102.

The fuel nozzle can be configured to emit the fuel through one or more fuel orifices having an inside diameter dimension that is referred to as "nozzle diameter." The flame holder support structure 106 can support the flame holder 102 to receive the fuel and oxidant mixture 219 at the distance $D_D$ away from the fuel nozzle greater than 20 times the nozzle diameter. In another embodiment, the flame holder 102 is disposed to receive the fuel and oxidant mixture 219 at the distance $D_D$ away from the fuel nozzle between 100 times and 1100 times the nozzle diameter. Preferably, the flame holder support structure 106 is configured to hold the flame holder 102 at a distance about 200 times or more of the nozzle diameter away from the fuel nozzle. When the fuel and oxidant mixture 219 travels about 200 times the nozzle diameter or more, the fuel and oxidant mixture 219 is sufficiently homogenized to cause the combustion reaction 201 to produce minimal NOx.

The fuel and oxidant source 101 can alternatively include a premix fuel and oxidant source, according to an embodiment. A premix fuel and oxidant source 101 can include a premix chamber (not shown), a fuel nozzle configured to output fuel into the premix chamber, and an oxidant (e.g., combustion air) channel configured to output the oxidant into the premix chamber. A flame arrestor can be disposed between the premix fuel and oxidant source 101 and the flame holder 102 and be configured to prevent flame flashback into the premix fuel and oxidant source 101.

The oxidant source, whether configured for entrainment in the combustion volume or for premixing, can include a blower configured to force the oxidant through the fuel and oxidant source 101.

The support structure 106 can be configured to support the flame holder 102 from a floor or wall (not shown) of the combustion volume, for example. In another embodiment, the support structure 106 supports the flame holder 102 from the fuel and oxidant source 101. Alternatively, the support structure 106 can suspend the flame holder 102 from an overhead structure (such as a flue, in the case of an up-fired system). The support structure 106 can support the flame holder 102 in various orientations and directions.

The support structure 106 can be configured to support the plurality of flame holder sections. The flame holder support structure 106 can include a metal superalloy, a cementatious, and/or ceramic refractory material. In an embodiment, the plurality of adjacent flame holder sections can be joined with a fiber reinforced refractory cement.

Referring again to both FIGS. 1 and 2B, the combustion channels 210 can be of various shapes, based on the shapes and positions of the slats 104. In an embodiment, the combustion channels 210 can include elongated squares, each having a width W. In another embodiment, the combustion channels 210 can include elongated hexagons, each having a width W between opposing sides of the hexagons. In another embodiment, the combustion channels 210 can include truncated cones or truncated pyramids (e.g., frustums), each having a variable width W. Alternatively, the width W can be defined as the shortest distance between the two adjacent slats 104 defining the combustion channel 210. In some embodiments, the combustion channels 210 can each have a lateral dimension D equal to or greater than a quenching distance of the flame based on standard reference conditions. Alternatively, the combustion channels 210 may have lateral dimension D less than a standard reference quenching distance.

In one range of embodiments, each of the plurality of combustion channels 210 has a lateral dimension D between 0.05 inch and 1.0 inch. Preferably, each of the plurality of combustion channels 210 has a lateral dimension D between 0.1 inch and 0.5 inch. For example, the plurality of combustion channels 210 can each have a lateral dimension D of about 0.2 to 0.4 inch.

The void fraction of a flame holder 102 is defined as the total volume of all combustion channels 210 in a section of the flame holder 102 divided by a total volume of the flame holder 102 including the slats 104 and combustion channels 210. The flame holder 102 should have a void fraction between 0.10 and 0.90. In an embodiment, the flame holder 102 can have a void fraction between 0.30 and 0.80. In another embodiment, the flame holder 102 can have a void fraction of about 0.70. Using a void fraction of about 0.70 was found to be especially effective for producing very low NOx.

The flame holder 102 can be formed from a fiber reinforced cast refractory material and/or a refractory material such as an aluminum silicate material. For example, the flame holder 102 can be formed to include mullite or cordierite. Additionally or alternatively, the flame holder body 208 can include a metal superalloy such as INCONEL or HASTELLOY. Additionally or alternatively, the flame holder 102 may be formed from a high temperature non-metallic material such as silicon carbide and/or zirconia.

The combustion channels 210 can be parallel to one another and normal to the first and second edges 212, 214. In another embodiment, the combustion channels 210 can be parallel to one another and formed at an angle relative to the first and second edges 212, 214. In another embodiment, the combustion channels 210 can be non-parallel to one another.

In another embodiment, which is not necessarily preferred, the slats 104 may be formed from reticulated ceramic material. The term "reticulated" refers to a netlike structure. Reticulated ceramic material is often made by dissolving a slurry into a sponge of specified porosity, allowing the slurry to harden, and burning away the sponge and curing the ceramic.

In another embodiment, which is not necessarily preferred, the slats 104 may be formed from a ceramic material that has been punched, bored or cast to create channels.

In another embodiment, the flame holder 102 can include a plurality of tubes or pipes bundled together. The plurality of combustion channels 210 can include hollow cylinders and can optionally also include interstitial spaces between the bundled tubes. In an embodiment, the plurality of tubes can include ceramic tubes. Refractory cement can be included between the tubes and configured to adhere the tubes together. In another embodiment, the plurality of tubes can include metal (e.g., superalloy) tubes. The plurality of tubes can be held together by a metal tension member circumferential to the plurality of tubes and arranged to hold the plurality of tubes together. The metal tension member can include stainless steel, a superalloy metal wire, and/or a superalloy metal band.

The inventors contemplate various explanations for why burner systems including the flame holder 102 provide such clean combustion.

According to an embodiment, the flame holder 102 may act as a heat source to maintain a combustion reaction 201 even under conditions where a combustion reaction 201 would not be stable when supported by a conventional flame holder 102. This capability can be leveraged to support combustion using a leaner fuel-to-oxidant mixture than is typically feasible. Thus, according to an embodiment, at the point where the fuel stream contacts the first edges 212 of the slats 104, an average fuel-to-oxidant ratio of the fuel stream is below a (conventional) lower combustion limit of the fuel component of the fuel stream—lower combustion limit defines the lowest concentration of fuel at which a fuel and oxidant mixture 219 will burn when exposed to a momentary ignition source under normal atmospheric pressure and an ambient temperature of 25° C. (77° F.).

The flame holder 102 and systems including the flame holder 102 described herein were found to provide substantially complete combustion of CO (single digit ppm down to undetectable, depending on experimental conditions), while supporting low NOx. According to one interpretation, such a performance can be achieved due to a sufficient mixing used to lower peak flame temperatures (among other strategies). Flame temperatures tend to peak under slightly rich conditions, which can be evident in any diffusion flame that is insufficiently mixed. By sufficiently mixing, a homogenous and slightly lean mixture can be achieved prior to combustion. This combination can result in reduced flame temperatures, and thus reduced NOx formation. In one embodiment, "slightly lean" may refer to 3% $O_2$, i.e., an equivalence ratio of ~0.87. Use of even leaner mixtures is possible, but may result in elevated levels of $O_2$. Moreover, the inventors believe that the slats 104 may act as a heat sink for the combustion fluid. This effect may alternatively or additionally reduce combustion temperatures and lower NOx.

According to another interpretation, production of NOx can be reduced if the combustion reaction 201 occurs over a very short duration of time. Rapid combustion causes the reactants (including oxygen and entrained nitrogen) to be exposed to NOx-formation temperature for a time too short for NOx formation kinetics to cause significant production of NOx. The time required for the reactants to pass through the flame holder 102 is very short compared to a conventional flame. The low NOx production associated with flame holder combustion may thus be related to the short duration of time required for the reactants (and entrained nitrogen) to pass through the flame holder 102.

Figure 2C:
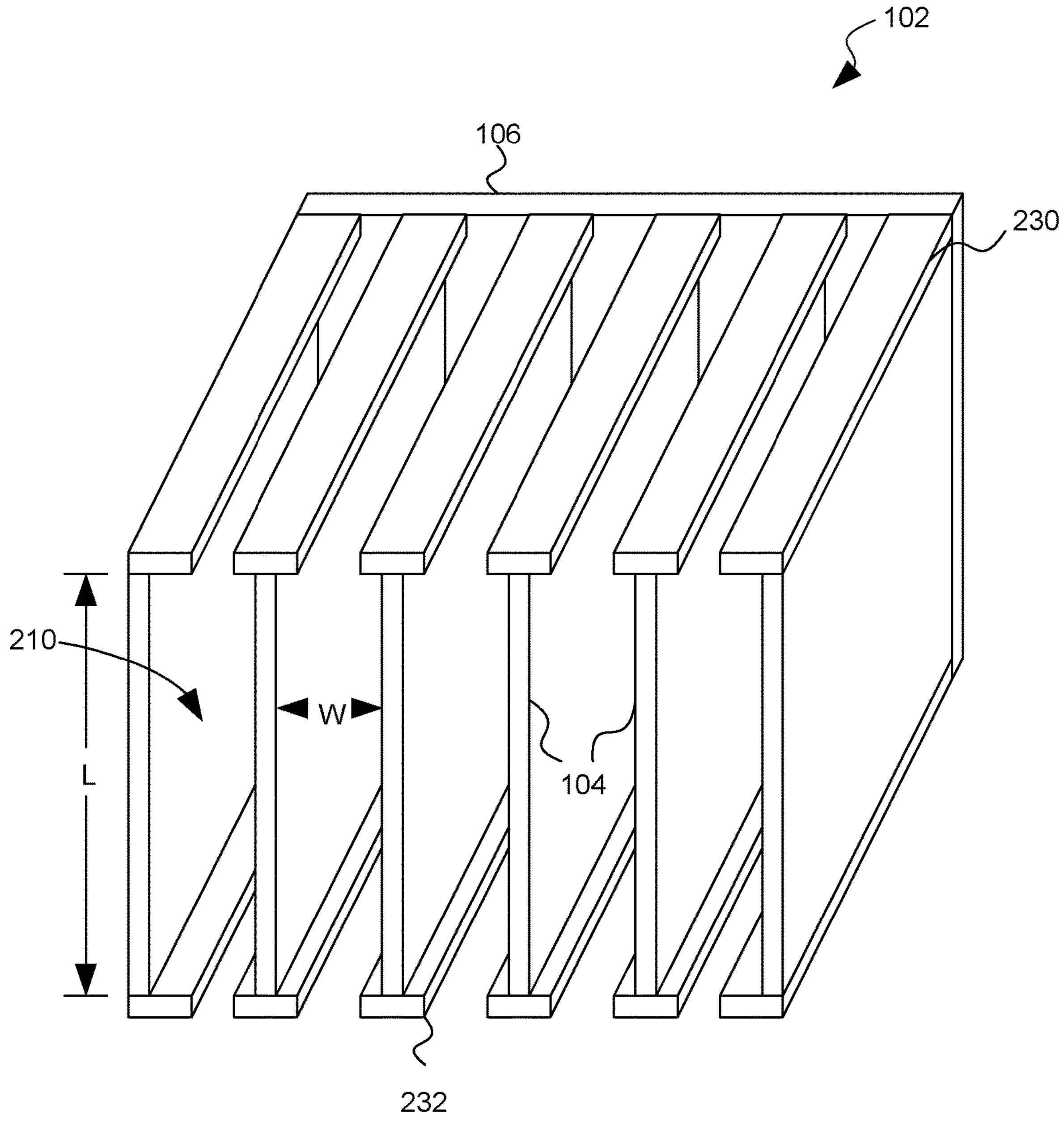
FIG. 2C is a perspective view of a flame holder including a plurality of slats, according to an embodiment.

FIG. 2C is a diagram of a flame holder 102, according to an alternate embodiment. The flame holder 102 of FIG. 2C is substantially similar to the flame holder 102 of FIG. 2A. However, the flame holder 102 of FIG. 2C includes a plurality of top narrowing members 230 each placed on top of respective slat 104. The top narrowing members 230 narrow an exit of the combustion channels 210. Additionally, the flame holder 102 of FIG. 2C includes bottom narrowing members 232 positioned on the bottom of each respective slat 104. The bottom narrowing members 232 narrow the entrances into the combustion channels 210. The top narrowing members 230, and the bottom narrowing members 232 can increase an efficiency of the combustion reaction 201.

In operation, the flame holder 102 of FIG. 2C may improve flame stabilization. For example, a fuel/oxidant may exhibit relatively high velocity at an inlet of the combustion channels 210. The velocity of the fuel/oxidant may then decrease as the fuel/oxidant enters the combustion channels 210 and then increase as the fuel/oxidant enters spaces between the top narrowing members 230 and exits the flame holder 102. Additionally, the fuel/oxidant may form one or more eddies within the combustion channels 210.

According to an embodiment, the flame holder 102 can include the bottom narrowing members 232 and not the top narrowing members 230. Alternatively, the flame holder 102 can include the top narrowing members 230 but not the bottom narrowing members 232.

According to an embodiment, the top narrowing members 230 and the bottom narrowing members 232 have differing dimensions from each other. Alternatively, the top and bottom narrowing members 230, 232 can have substantially similar or identical dimensions.

Figure 3:
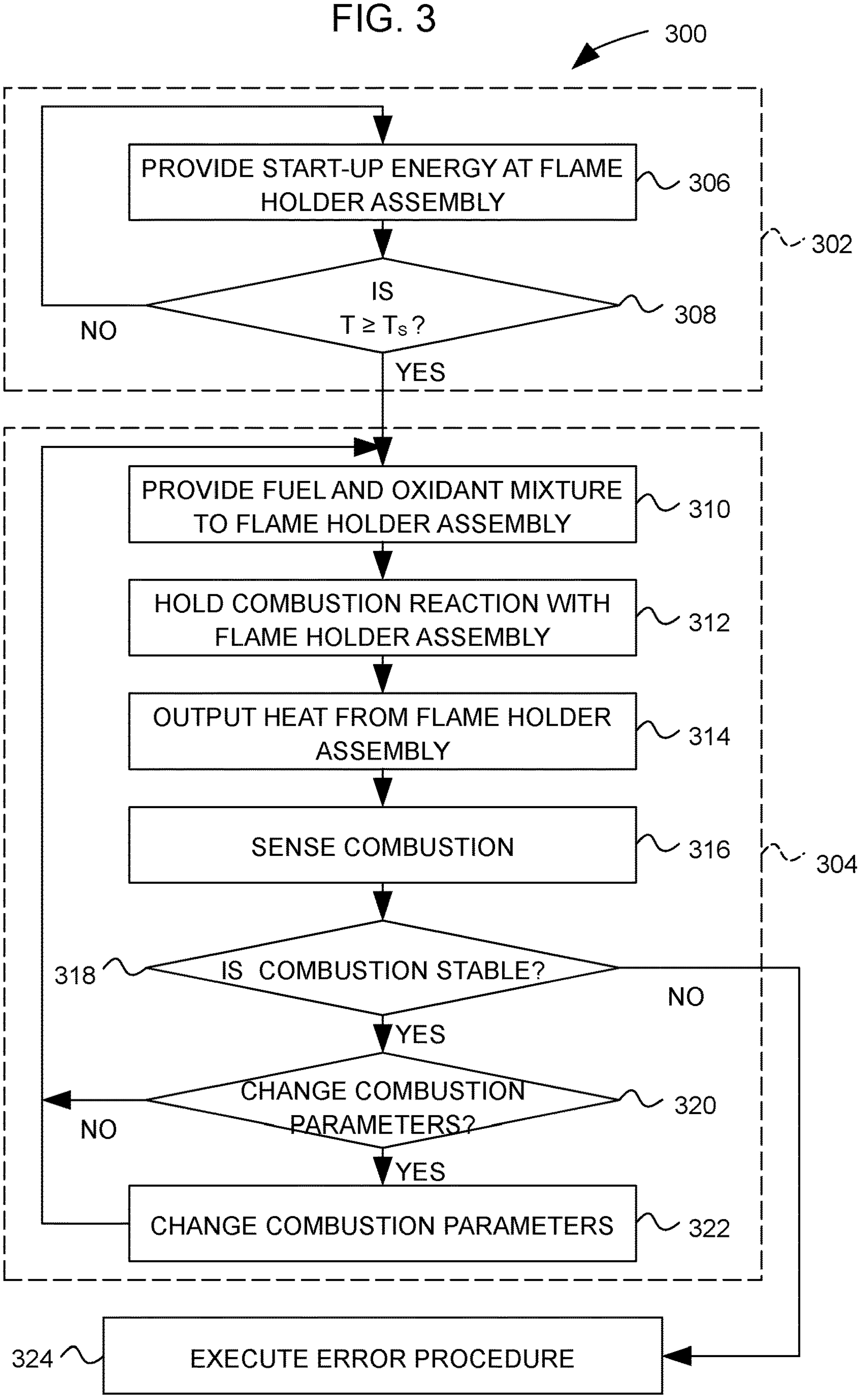
FIG. 3 is a flow diagram of a process for operating a combustion system including a flame holder, according to an embodiment.

FIG. 3 is a flow chart showing a method 300 for operating a burner system including the flame holder shown and described herein. To operate a burner system including a flame holder, the flame holder is first heated to a temperature sufficient to maintain combustion of the fuel and oxidant mixture.

According to a simplified description, the method 300 begins with step 302, wherein the flame holder is preheated to a start-up temperature, $T_S$. After the flame holder is raised to the start-up temperature, the method proceeds to step 304, wherein fuel and oxidant are provided to the flame holder and combustion is held by the flame holder.

According to a more detailed description, step 302 begins with step 306, wherein start-up energy is provided at the flame holder. Simultaneously or following providing start-up energy, a decision step 308 determines whether the temperature T of the flame holder is at or above the start-up temperature, $T_S$. As long as the temperature of the flame holder is below its start-up temperature, the method loops between steps 306 and 308 within the preheat step 302. In decision step 308, if the temperature T of at least a predetermined portion of the flame holder is greater than or equal to the start-up temperature, the method 300 proceeds to overall step 304, wherein fuel and oxidant is supplied to and combustion is held by the flame holder.

Step 304 may be broken down into several discrete steps, at least some of which may occur simultaneously.

Proceeding from decision step 308, a fuel and oxidant mixture is provided to the flame holder, as shown in step 310. The fuel and oxidant may be provided by a fuel and oxidant source that includes a separate fuel nozzle and combustion air source, for example. In this approach, the fuel and combustion air are output in one or more directions selected to cause the fuel and combustion air mixture to be received by an input face of the flame holder. The fuel may entrain the combustion air (or alternatively, the combustion air may dilute the fuel) to provide a fuel and oxidant mixture at the input face of the flame holder at a fuel dilution selected for a stable combustion reaction that can be held within the combustion channels of the flame holder.

Proceeding to step 312, the combustion reaction is held by the flame holder.

In step 314, heat may be output from the flame holder. The heat output from the flame holder may be used to power an industrial process, heat a working fluid, generate electricity, or provide motive power, for example. In optional step 316, the presence of combustion may be sensed. Various sensing approaches have been used and are contemplated by the inventors. Generally, combustion held by the flame holder is very stable and no unusual sensing requirement is placed on the system. Combustion sensing may be performed using an infrared sensor, a video sensor, an ultraviolet sensor, a charged species sensor, thermocouple, thermopile, and/or other known combustion sensing apparatuses. In an additional or alternative variant of step 316, a pilot flame or other ignition source may be provided to cause ignition of the fuel and oxidant mixture in the event combustion is lost at the flame holder.

Proceeding to decision step 318, if combustion is sensed not to be stable, the method 300 may exit to step 324, wherein an error procedure is executed. For example, the error procedure may include turning off fuel flow, re-executing the preheating step 302, outputting an alarm signal, igniting a stand-by combustion system, or other steps. If, in decision step 318, combustion in the flame holder is determined to be stable, the method 300 proceeds to decision step 320, wherein it is determined if combustion parameters should be changed. If no combustion parameters are to be changed, the method loops (within step 304) back to step 310, and the combustion process continues. If a change in combustion parameters is indicated, the method 300 proceeds to step 322, wherein the combustion parameter change is executed. After changing the combustion parameter(s), the method loops (within step 304) back to step 310, and combustion continues.

Combustion parameters may be scheduled to be changed, for example, if a change in heat demand is encountered. For example, if less heat is required (e.g., due to decreased electricity demand, decreased motive power requirement, or lower industrial process throughput), the fuel and oxidant flow rate may be decreased in step 322. Conversely, if heat demand is increased, then fuel and oxidant flow may be increased. Additionally or alternatively, if the combustion system is in a start-up mode, then fuel and oxidant flow may be gradually increased to the flame holder over one or more iterations of the loop within step 304.

Referring again to FIGS. 1 and 2B, the heater 114 is operatively coupled to the flame holder 102. The flame holder 102 operates by outputting heat to the incoming fuel and oxidant mixture 219. After combustion is established, this heat is provided by the combustion reaction 201; but before combustion is established, the heat is provided by the heater 114.

Various heating apparatuses have been used and are contemplated by the inventors. In some embodiments, the heater 114 can include a flame holder 102 configured to support a flame disposed to heat the flame holder 102. The fuel and oxidant source 101 can include a fuel nozzle configured to emit a fuel stream and the air source configured to output combustion air adjacent to the fuel stream. The fuel nozzle and air source can be configured to output the fuel stream to be progressively diluted by the combustion air. The flame holder 102 can be disposed to receive a diluted fuel and oxidant mixture 219 that supports a combustion reaction 201 that is stabilized by the flame holder 102 when the flame holder 102 is at an operating temperature. A start-up flame holder, in contrast, can be configured to support a start-up flame at a location corresponding to a relatively rich fuel and oxidant mixture 219 that is stable without stabilization provided by the heated flame holder 102.

The burner system 200 can further include a controller 110 operatively coupled to the heater 114 and to a data interface. For example, the controller 110 can be configured to control a start-up flame holder actuator configured to cause the start-up flame holder to hold the start-up flame when the flame holder 102 needs to be pre-heated and to not hold the start-up flame when the flame holder 102 is at an operating temperature (e.g., when $T \geq T_S$).

Various approaches for actuating a start-up flame are contemplated. In one embodiment, the start-up flame holder includes a mechanically-actuated bluff body configured to be actuated to intercept the fuel and oxidant mixture 219 to cause heat-recycling vortices and thereby hold a start-up flame; or to be actuated to not intercept the fuel and oxidant mixture 219 to cause the fuel and oxidant mixture 219 to proceed to the flame holder 102. In another embodiment, a fuel control valve, blower, and/or damper may be used to select a fuel and oxidant mixture 219 flow rate that is sufficiently low for a start-up flame to be jet-stabilized; and upon reaching a flame holder 102 operating temperature, the flow rate may be increased to "blow out" the start-up flame. In another embodiment, the heater 114 may include an electrical power supply operatively coupled to the controller 110 and configured to apply an electrical charge or voltage to the fuel and oxidant mixture 219. An electrically conductive start-up flame holder may be selectively coupled to a voltage ground or other voltage selected to attract the electrical charge in the fuel and oxidant mixture 219. The attraction of the electrical charge was found by the inventors to cause a start-up flame to be held by the electrically conductive start-up flame holder.

In another embodiment, the heater 114 may include an electrical resistance heater configured to output heat to the flame holder 102 and/or to the fuel and oxidant mixture 219. The electrical resistance heater 114 can be configured to heat up the flame holder 102 to an operating temperature. The heater 114 can further include a power supply and a switch operable, under control of the controller 110, to selectively couple the power supply to the electrical resistance heater 114.

The electrical resistance heater 114 can be formed in various ways. For example, the electrical resistance heater 114 can be formed from KANTHAL® wire (available from Sandvik Materials Technology division of Sandvik AB of Hallstahammar, Sweden) threaded through at least a portion of the combustion channels 210 defined by the slats 104. Alternatively, the heater 114 can include an inductive heater, a high energy (e.g., microwave or laser) beam heater, a frictional heater, or other types of heating technologies.

Other forms of start-up apparatuses are contemplated. For example, the heater 114 can include an electrical discharge igniter or hot surface igniter configured to output a pulsed ignition to the air and fuel. Additionally or alternatively, a start-up apparatus can include a pilot flame apparatus disposed to ignite a fuel and oxidant mixture 219 that would otherwise enter the flame holder 102. An electrical discharge igniter, hot surface igniter, and/or pilot flame apparatus can be operatively coupled to the controller 110, which can cause the electrical discharge igniter or pilot flame apparatus to maintain combustion of the fuel and oxidant mixture 219 in or upstream from the flame holder 102 before the flame holder 102 is heated sufficiently to maintain combustion.

The burner system 200 can further include a sensor 112 operatively coupled to the control circuit 110. The sensor 112 can include a heat sensor configured to detect infrared radiation or a temperature of the flame holder 102. The control circuit 110 can be configured to control the heating apparatus 114 responsive to input from the sensor 112. Optionally, a fuel control valve can be operatively coupled to the controller 110 and configured to control a flow of fuel to the fuel and oxidant source 101. Additionally or alternatively, an oxidant blower or damper can be operatively coupled to the controller 110 and configured to control flow of the oxidant (or combustion air).

The sensor 112 can further include a combustion sensor operatively coupled to the control circuit 110, the combustion sensor being configured to detect a temperature, video image, and/or spectral characteristic of a combustion reaction 201 held by the flame holder 102. The fuel control valve can be configured to control a flow of fuel from a fuel source to the fuel and oxidant source 101. The controller 110 can be configured to control the fuel control valve responsive to input from the combustion sensor 112. The controller 110 can be configured to control the fuel control valve and/or oxidant blower or damper to control a preheat flame type of heater 114 to heat the flame holder 102 to an operating temperature. The controller 110 can similarly control the fuel control valve and/or the oxidant blower or damper to change the fuel and oxidant mixture 219 flow responsive to a heat demand change received as data via the data interface.

Figure 4:
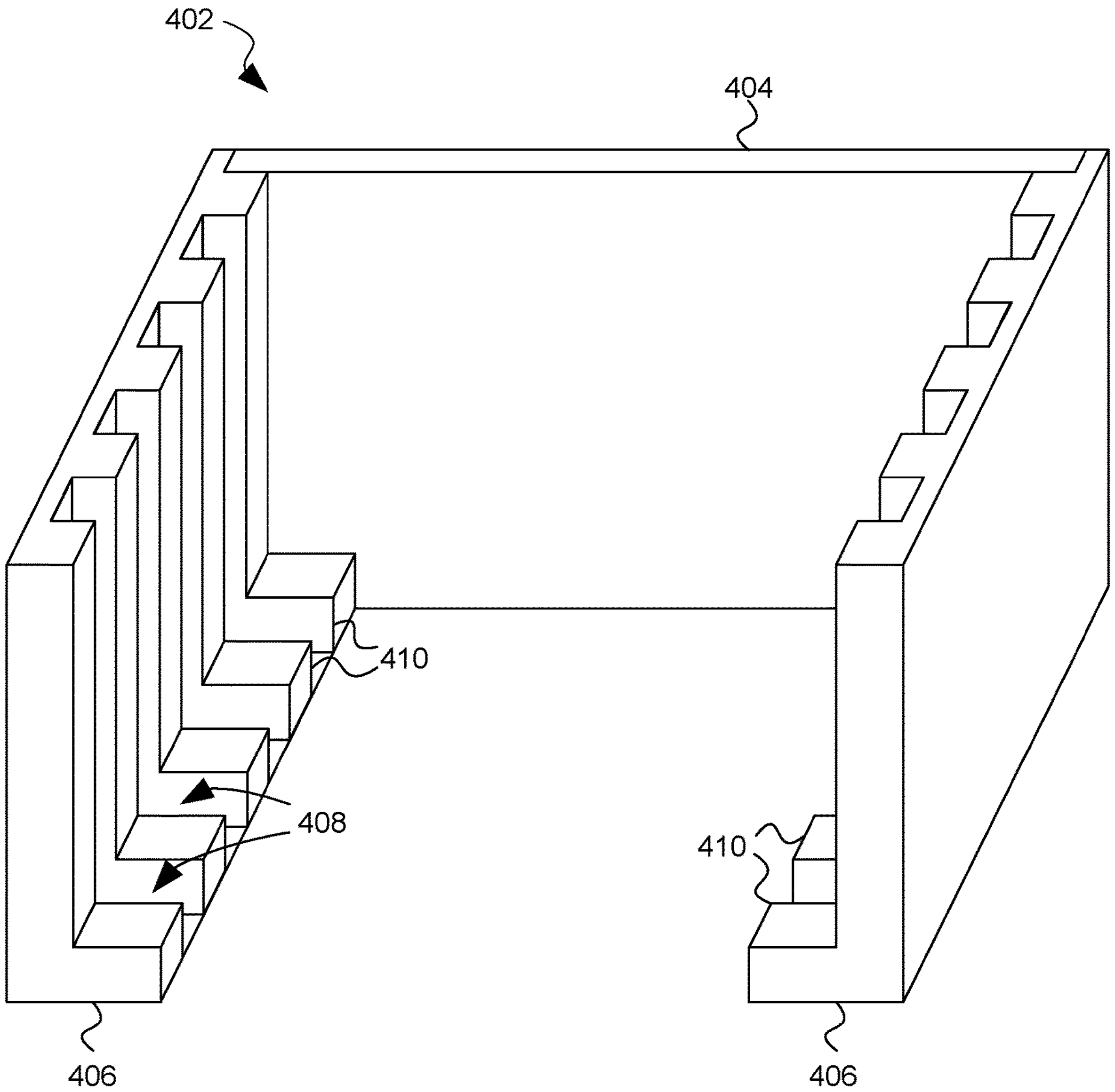
FIG. 4 is a diagram of a support structure for a flame holder, according to an embodiment.

FIG. 4 is a diagram of a flame holder 402, according to an embodiment. The flame holder 402 includes a flame holder support structure 406 and a slat 404. Only a single slat 404 is shown in FIG. 4 in order to more clearly illustrate the flame holder support structure 406. In practice, the flame holder 402 will include a plurality of slats 404.

The flame holder support structure 406 includes a plurality of slots 408 defined by support arms 410. The dimensions of the slots 408 are selected to hold the slats 404. In particular, each slot 408 is configured to hold a single slat 404. The flame holder support structure 406 holds an array of slats 404 in parallel with each other and extending in a direction transverse to the general direction of the output of the fuel and oxidant. When all of the slots 408 hold a slat 404, the flame holder 402 defines a plurality of combustion channels 210 between adjacent slats 404 as described previously.

Figure 5:
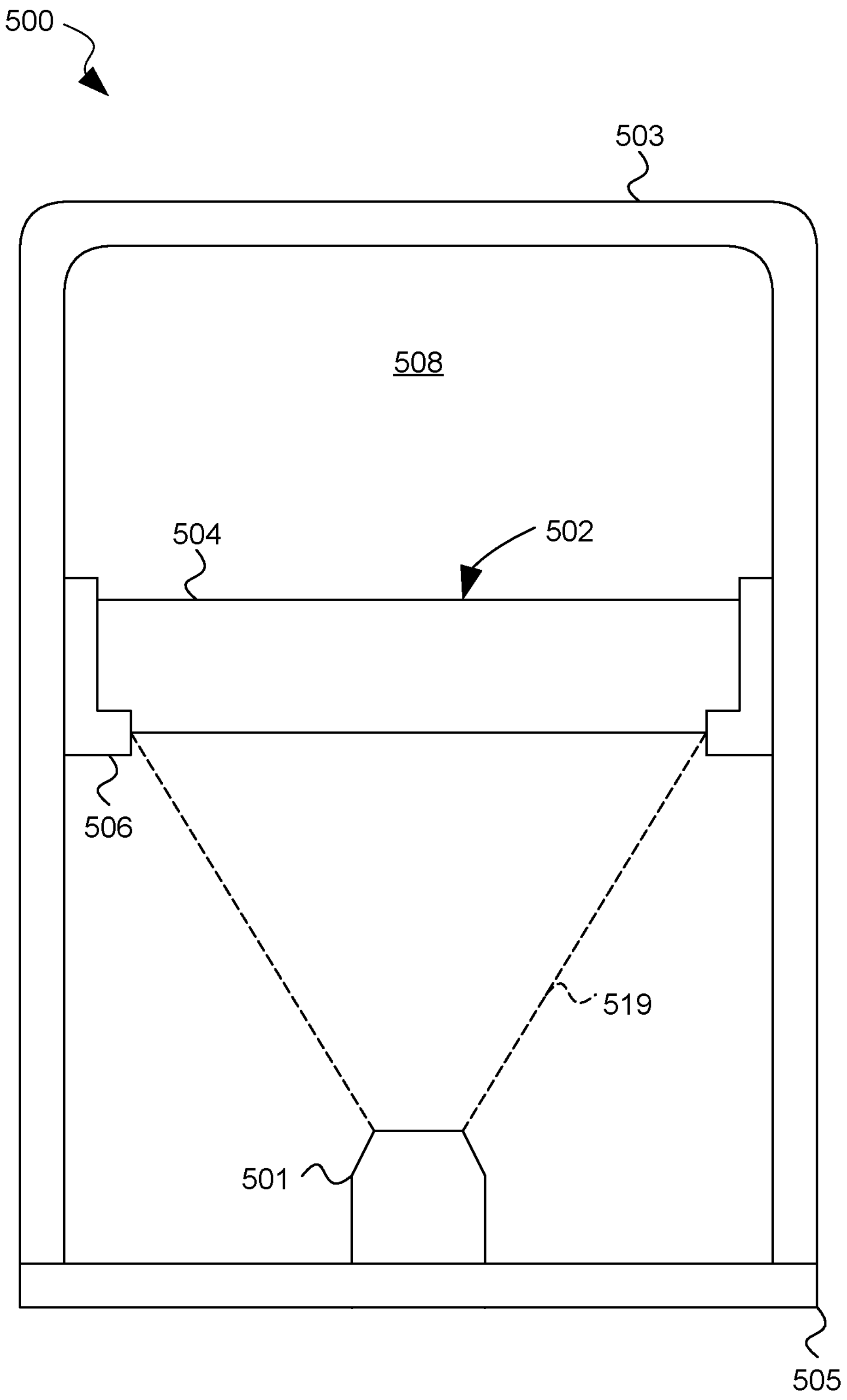
FIG. 5 is a diagram of a combustion system including an enclosure and a flame holder, according to an embodiment.

FIG. 5 is a diagram of a combustion system 500, according to an embodiment. The combustion system 500 includes an enclosure 503 defining a combustion volume 508. A fuel nozzle 501 is positioned within the combustion volume 508 near a floor 505 coupled to the enclosure 503. A flame holder 502 is positioned within the combustion volume 508. The flame holder 502 includes a plurality of slats 504 supported by support structure 506.

The fuel nozzle 501 is configured to output fuel and oxidant 519 onto the flame holder 502. The flame holder 502 sustains a combustion reaction 201 of the fuel and oxidant 519 primarily within the flame holder 502.

According to an embodiment, the slats 504 are arranged in an array extending in a direction transverse to a direction of output of the fuel and oxidant 519 from the fuel nozzle 501. The slats 504 are discrete slats positioned in parallel with each other. In particular, each slat 504 is separated from the next slat 504 by a selected distance. The arrangement of slats 504 in parallel defines a plurality of combustion channels 210 between the slats 504. Each combustion channel 210 has a width W that is the selected distance between adjacent slats 504. Only a single slat 504 of the plurality of slats 504 is visible in FIG. 5 due to the nature of the side view of the combustion system 500 in FIG. 5.

The fuel nozzle 501 outputs the fuel and oxidant 519 toward the flame holder 502. The fuel and oxidant 519 enters into the combustion channels 210 between the slats 504. The flame holder 502 sustains a combustion reaction 201 of the fuel and oxidant 519 primarily within the combustion channels 210 between the slats 504.

According to an embodiment, the length L of the combustion channels 210 corresponds to the height of the slats 504 in a direction along a general axis of travel of the fuel and oxidant 519 from the fuel nozzle 501. According to an embodiment, the length L of the combustion channels 210 is at least five times the width W of the combustion channels 210.

The support structure 506 includes two portions each mounted to an inner wall of the enclosure 503. The brackets 506 can be fixed to the inner wall of the enclosure 503 by any mounting mechanism suitable for a very high temperature environment. According to an embodiment, the support structure 506 can include a refractory material. The support structure 506 can be similar to the support structure 406 of FIG. 4. Alternatively, the support structure 506 can include other suitable structure for holding an array of slats 504. The support structure 506 holds the slats 504 at a selected position relative to the fuel nozzle 501. Additionally, the support structure 506 holds the discrete slats 504 in position relative to each other. Thus, the support structure 506 holds the slats 504 in an array in which the slats 504 extend parallel to each other and define fuel channels between adjacent slats 504.

Figure 6:
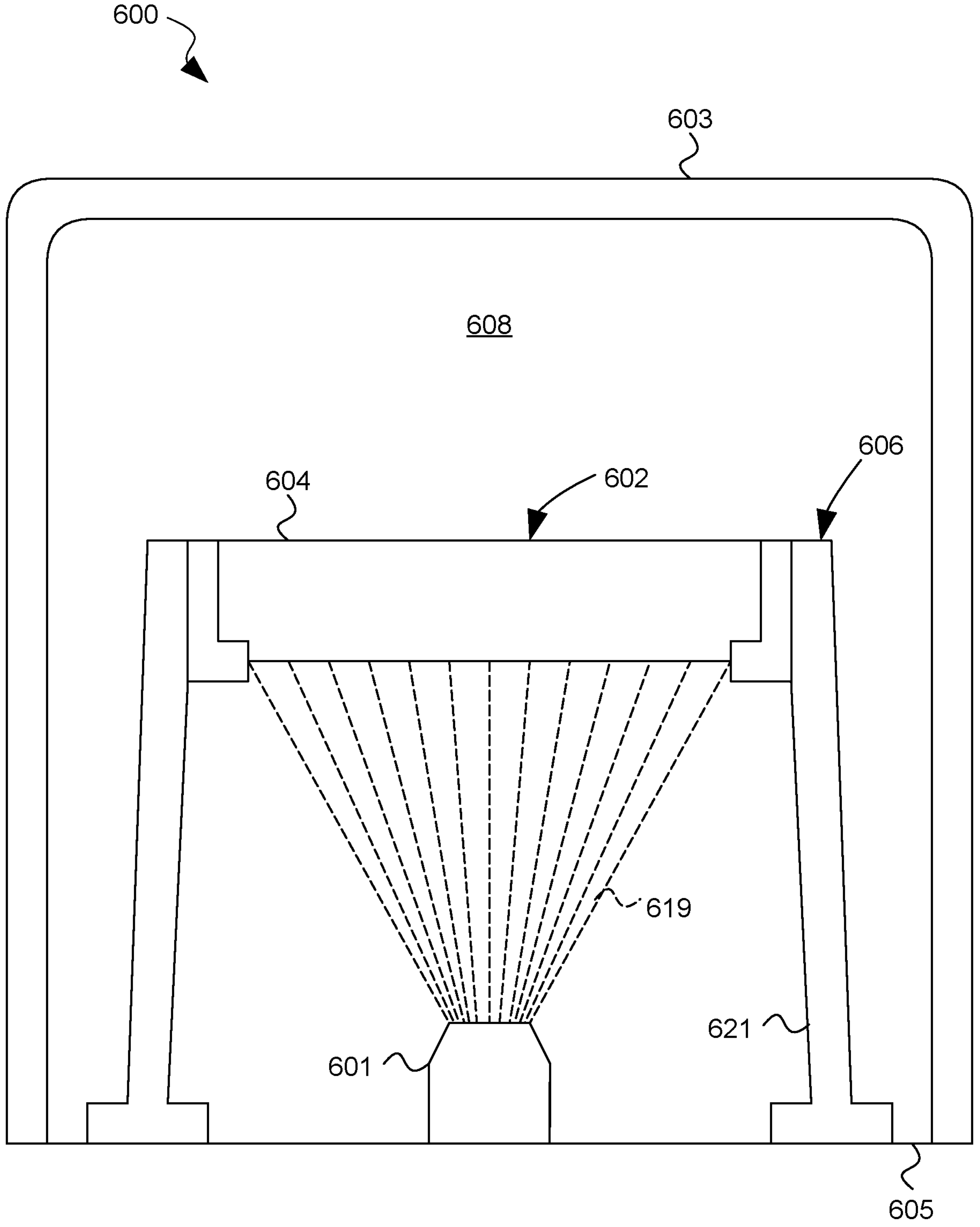
FIG. 6 is a diagram of a combustion system including a flame holder, according to an embodiment.

FIG. 6 is a diagram of a combustion system 600, according to an embodiment. The combustion system 600 includes an enclosure 603 defining a combustion volume 608. A fuel and oxidant source 601 is positioned within the combustion volume 608 near a floor 605 coupled to the enclosure 603. A flame holder 602 is positioned within the combustion volume 608. The flame holder 602 includes a plurality of slats 604 supported by support structure 606.

The fuel and oxidant source 601 is configured to output fuel and oxidant 619 onto the flame holder 602. The flame holder 602 sustains a combustion reaction 201 of the fuel and oxidant 619 primarily within the flame holder 602.

According to an embodiment, the slats 604 are arranged in an array extending in a direction transverse to a direction of output of the fuel and oxidant 619 from the fuel and oxidant source 601. The slats 604 are discrete slats 604 positioned in parallel with each other. In particular, each slat 604 is separated from the next slat 604 by a selected distance. The arrangement of slats 604 in parallel defines a plurality of combustion channels 210 between the slats 604. Each combustion channel 210 has a width W that is the selected distance between adjacent slats 604. Only a single slat 604 of the plurality of slats 604 is visible in FIG. 6 due to the nature of the side view of the combustion system 600 in FIG. 6.

The fuel nozzle 601 outputs the fuel and oxidant 619 toward the flame holder 602. The fuel and oxidant 619 enters into the combustion channels 210 between the slats 604. The flame holder 602 sustains a combustion reaction 201 of the fuel and oxidant 619 primarily within the combustion channels 210 between the slats 604.

According to an embodiment, the length L of the combustion channels 210 corresponds to the height of the slats 604 in a direction along an axis of travel of the fuel and oxidant 619 from the fuel and oxidant source 601. According to an embodiment, the length L of the combustion channels 210 is at least five times the width W of the combustion channels 210.

The support structure 606 includes two support structure portions each mounted to a floor 605 of the enclosure 603. Each support structure portion can include a respective support leg 621 that raises the flame holder 602 above the floor. The support structure 606 can be fixed to the floor 605 of the enclosure 603 by any suitable mounting mechanisms. According to an embodiment, the support structure 606 can include a refractory material. The support structure 606 can be similar to the support structure 406 of FIG. 4. Alternatively, the support structure 606 can include other suitable structure for holding an array of slats 604. The support structure 606 holds the slats 604 at a selected position relative to the fuel nozzle 601. Additionally, the support structure 606 holds the discrete slats 604 in position relative to each other. Thus, the support structure 606 holds slats 604 in an array in which the slats 604 extend parallel to each other and define fuel channels between adjacent slats 604.

Figure 7:
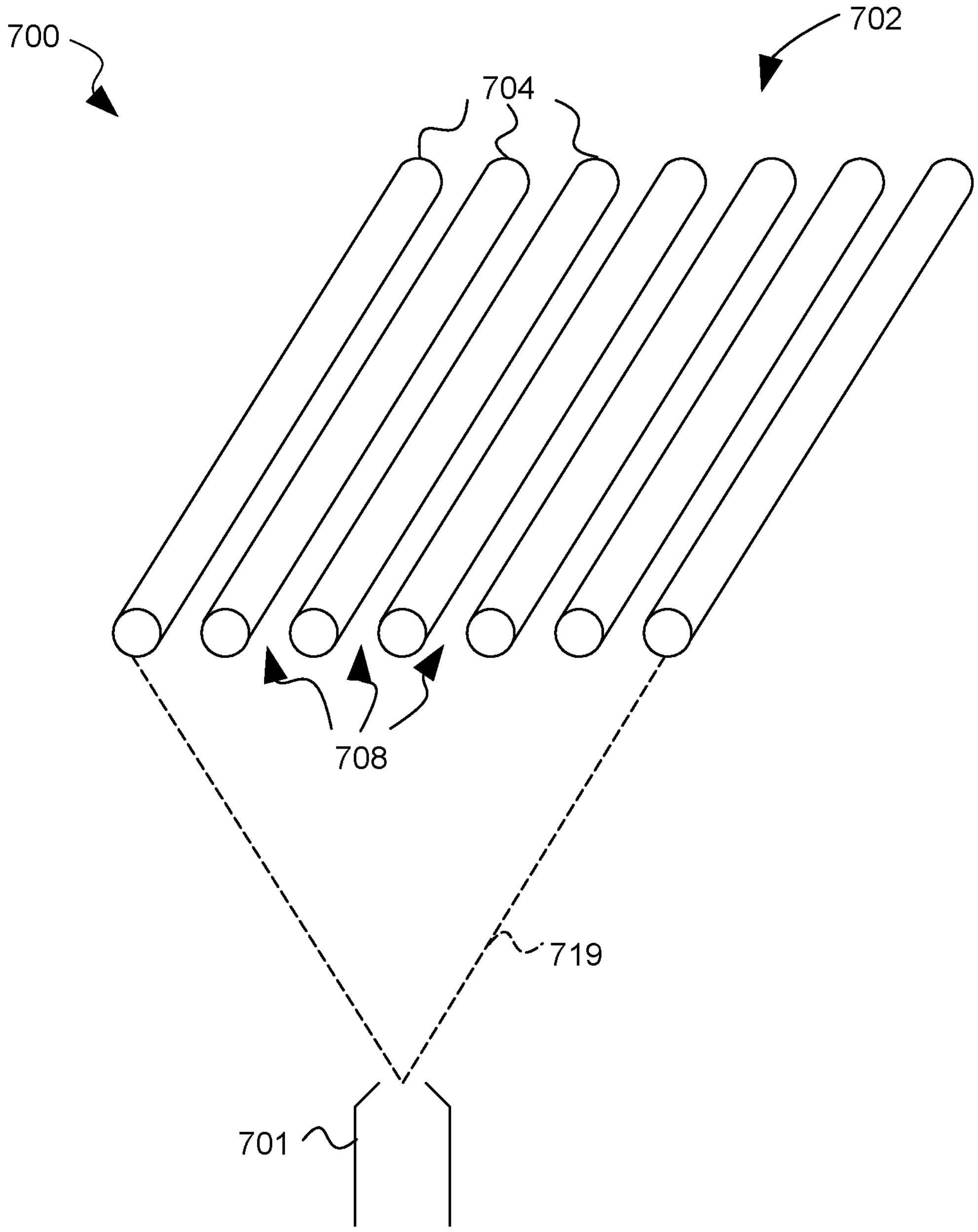
FIG. 7 is a diagram of elongated members of a flame holder, according to an embodiment.

FIG. 7 is a diagram of a combustion system 700 including a flame holder 702, according to an embodiment. The flame holder 702 includes a plurality of rods 704. According to an embodiment, the rods 704 may be cylindrical rods. The rods 704 are arranged in parallel a selected distance apart from each other. The gaps between adjacent rods 704 define combustion channel 708.

Though not shown, flame holder 702 includes a support structure configured to hold the rods 704 in positions relative to each other. In particular, the support structure holds the rods 704 a selected distance apart from each other and arranged in parallel to define the combustion channels 708. The support structure can include slots, grooves, brackets, or other mechanisms for holding the rods 704.

Figure 8:
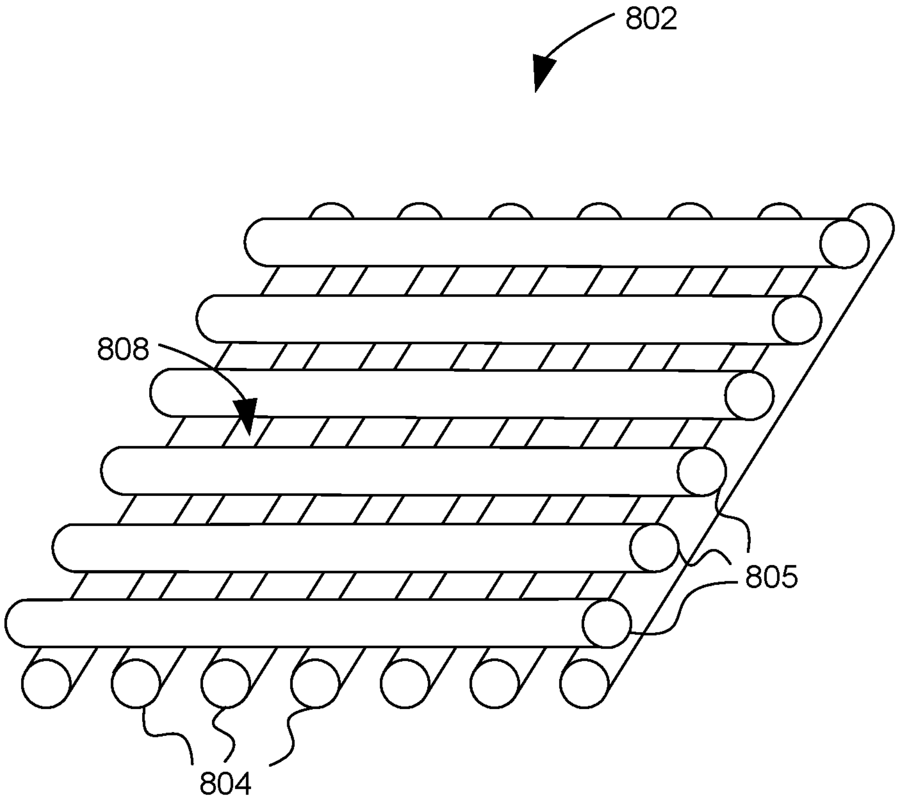
FIG. 8 is a diagram of elongated members of a flame holder, according to another embodiment.

FIG. 8 is a diagram of a flame holder 802, according to an embodiment. The flame holder 802 includes a plurality of rods 804 and 805. The rods 804 extend in a direction transverse to a direction of an output of the fuel and oxidant. The rods 805 extend in a direction transverse to both output the fuel and oxidant and to the rods 804. Rods 804, 805 form a crisscross pattern with the rods 805 on top of the rods 804. The rods 804, 805 define the combustion channels 808. The combustion channels 808 have a square cross-section when viewed from the top. However, the combustion channels 808 are not entirely isolated from each other due to the vertical offset between the rods 804, 805. Thus, the fuel and oxidant and the combustion reaction 201 of the fuel and oxidant can flow between combustion channels 808.

The rods 804, 805 are cylindrical rods. According to an embodiment, the rods 804 can have cross-sections other than circular. In particular, the rods 804 can include rectangular cross-sections, tapered cross-sections, or other cross-sections.

Though not shown, flame holder 802 includes a support structure configured to hold the rods 804 in positions relative to each other. In particular, the support structure holds the rods 804 a selected distance apart from each other and arranged in parallel to define the combustion channels 808. The support structure can include slots, grooves, brackets, or other mechanisms for holding the rods 804. While FIG. 8 has disclosed a flame holder 802 including rods 804, elongated members other than rods can be used instead of rods.

Figure 9:
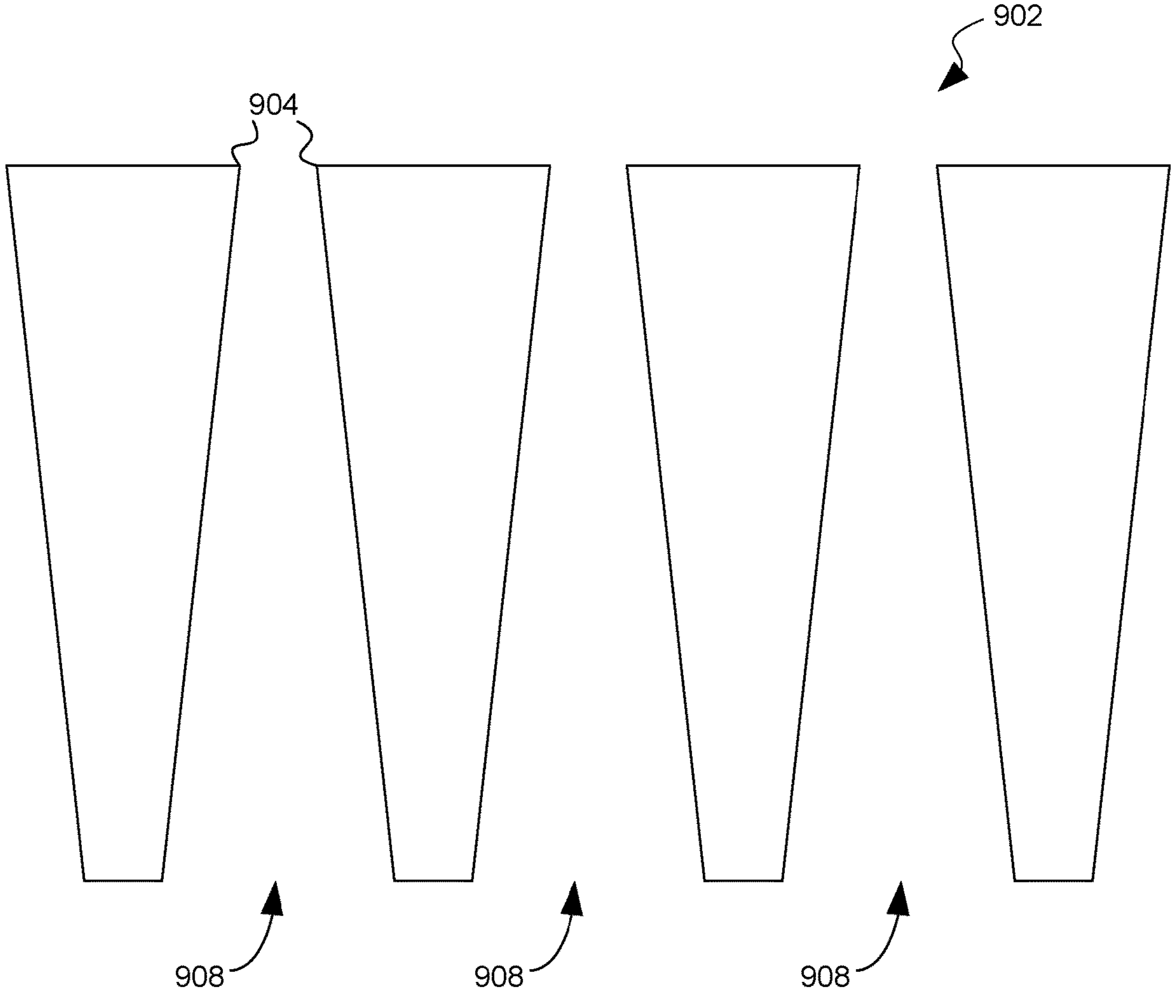
FIG. 9 is a cross-sectional diagram of tapered elongated members of a flame holder, according to an embodiment.

FIG. 9 is a cross-sectional diagram of a flame holder 902, according to an embodiment. The flame holder 902 includes a plurality of slats 904. The gap between adjacent slats 904 defines combustion channels 908. Due to the cross-sectional form of the slats 904, the combustion channel 908 has a ramjet or tapered shape. Fuel and oxidant enters into the combustion channels 908 at the wide bottom portion of the combustion channels 908. A combustion reaction of the fuel and oxidant occurs primarily within the combustion channels 908. Flue gases or uncombusted fuel and oxidant exit the combustion channels 908 at the narrower apertures defined by the tops of the slats 904.

Though not shown in FIG. 9, the flame holder 902 includes a support structure configured to hold the slats 904.

Figure 10:
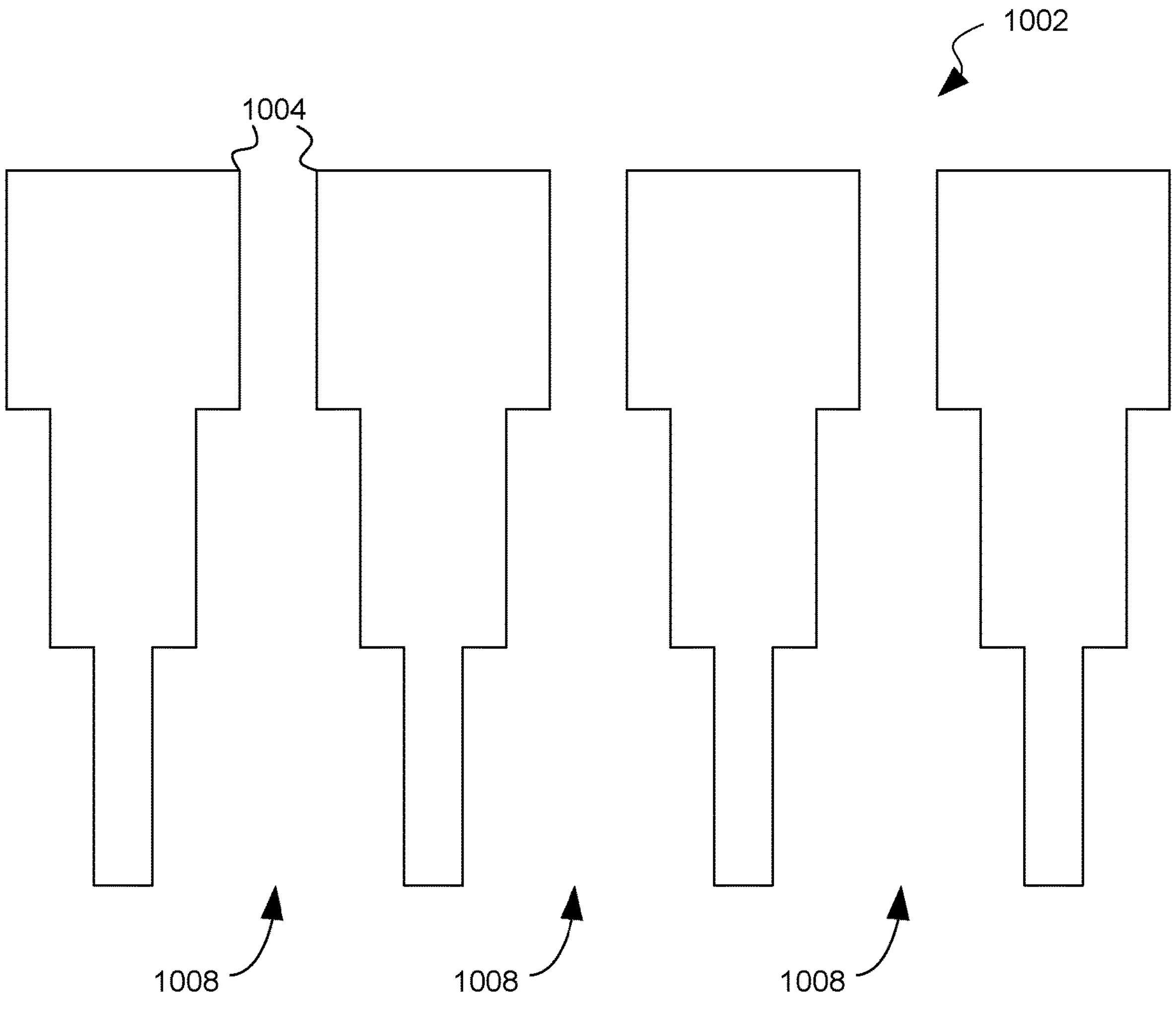
FIG. 10 is a cross-sectional diagram of stepped elongated members of a flame holder, according to an embodiment.

FIG. 10 is a cross-sectional diagram of a flame holder 1002, according to an embodiment. The flame holder 1002 includes a plurality of slats 1004. The gap between adjacent slats 1004 defines combustion channels 1008. Due to the cross-sectional form of the slats 1004, the combustion channel 1008 has a stepped shape. Fuel and oxidant enters into the combustion channels 1008 at the wide bottom portion of the combustion channels 1008. A combustion reaction of the fuel and oxidant occurs primarily within the combustion channels 1008. Flue gases or uncombusted fuel and oxidant exit the combustion channels 1008 at the narrower apertures at the top of the slats 1004.

Though not shown in FIG. 10, the flame holder 1002 includes a support structure configured to hold the slats 1004.

The inventors have recognized that for some fuels it is inherently challenging to maintain stable combustion. For example, in fuel combustion systems that employ high concentrations of hydrogen as fuel (up to 100% hydrogen) maintaining a stable flame and/or stable combustion may be difficult. The V-gutter embodiments described below with respect to FIGS. 11-13 provide a low pressure, low velocity region in the flow field of the fuel-oxidant mixture, which facilitates stability of the resulting flame/combustion. Furthermore, the inventors have found that embodiments described herein are useful for providing flame holding in combustion systems using fuels that are not particularly challenging with respect to combustion stability. According to other embodiments, the inventors have found that embodiments described herein are useful for providing flame holding in combustion systems using fuels having variable compositions, the variable compositions being characterized by flame speeds that are correspondingly variable. According to embodiments described herein, the inventors have found adaptability to fuels including a mixture of hydrogen and hydrocarbons in which the amount of hydrogen may vary between 0% and 100%, according to availability of respective fuel components.

Figure 11A:
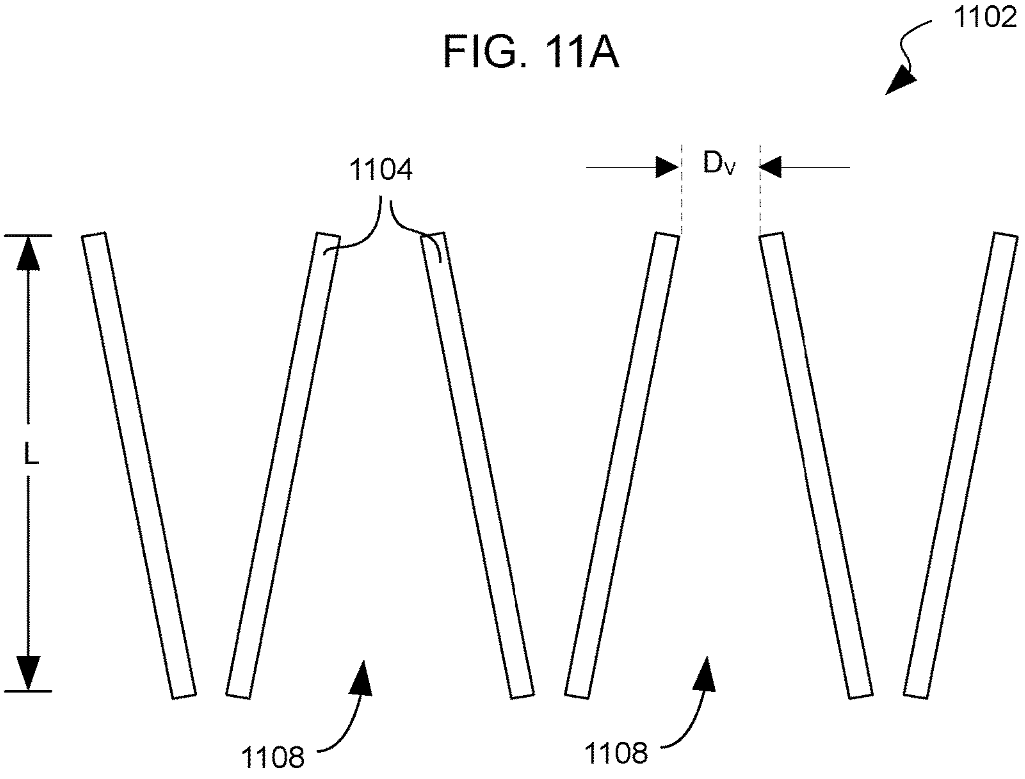
FIGS. 11A and 11B are cross-sectional diagrams of a flame holder, according to embodiments.
Figure 11B:
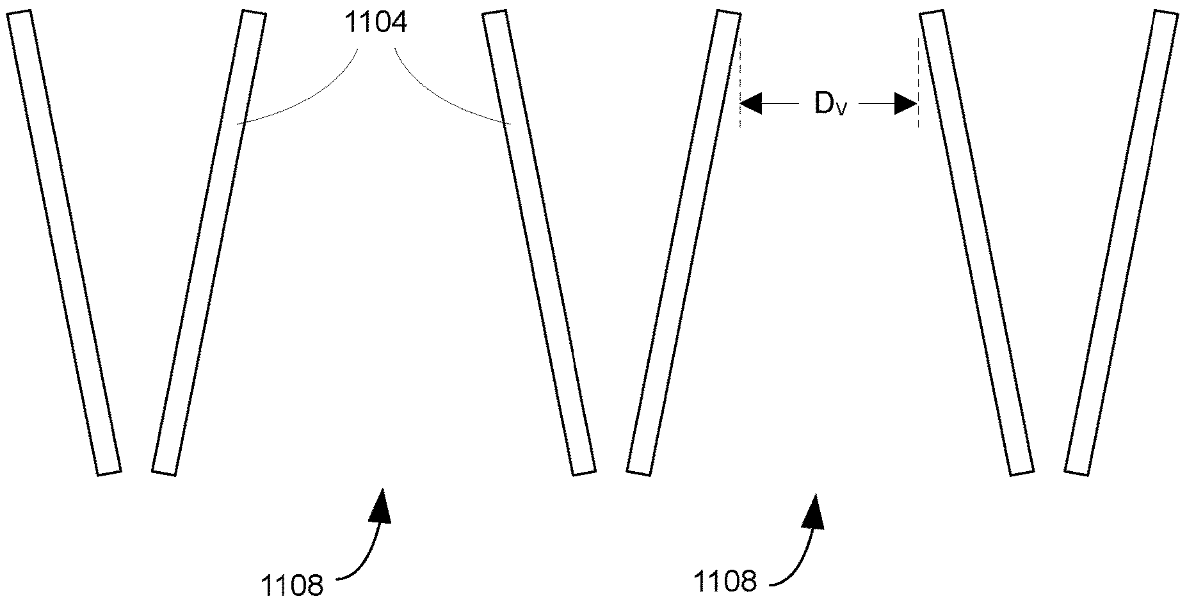

FIGS. 11A and 11B are cross-sectional diagrams of a flame holder 1102, according to an embodiment. The flame holder 1102 includes a plurality of slats 1104, pairs of which are formed into a "V" open at the bottom. A gap between adjacent pairs of slats 1104 defines combustion channels 1108. Due to the cross-sectional form of the slats 904, the combustion channel 1108 has a tapered shape. Fuel and oxidant enters into the combustion channels 1108 at the wide bottom portion of the combustion channels 1108. A combustion reaction of the fuel and oxidant occurs primarily within the combustion channels 1108. Flue gases or uncombusted fuel and oxidant exit the combustion channels 1108 at the narrower apertures at the top of the slats 1104. FIG. 11A shows each pair of slats separated by a narrow distance $D_V$, while FIG. 11B shows a greater distance $D_V$. The distances between adjacent "Vs" may be set arbitrarily and/or non-uniformly in various embodiments.

The slats 1104 of the flame holder 1102 may be formed from a fiber reinforced cast refractory material and/or a refractory material such as an aluminum silicate material. For example, the flame holder 102 can be formed to include mullite or cordierite. Additionally, or alternatively, the flame holder 1102 may be formed of, or include, a metal such as stainless steel and/or a metal superalloy such as INCONEL or HASTELLOY having a characteristic of high structural stability at high temperatures. Additionally or alternatively, the slats 1104 flame holder 102 may be formed from a high temperature non-metallic material such as silicon carbide and/or zirconia.

Figure 11C:
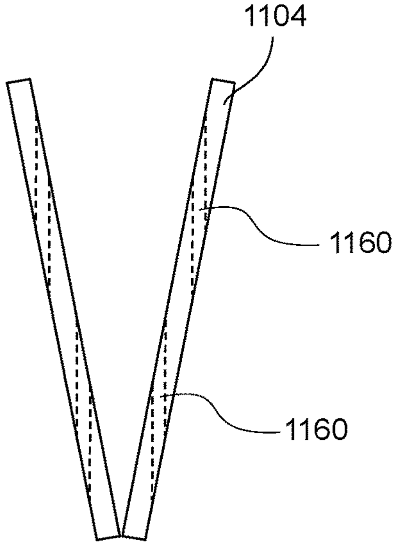
FIGS. 11C and 11D are cross-sectional diagrams of respective pairs of slats forming a V-gutter having openings, according to embodiments.
Figure 11D:
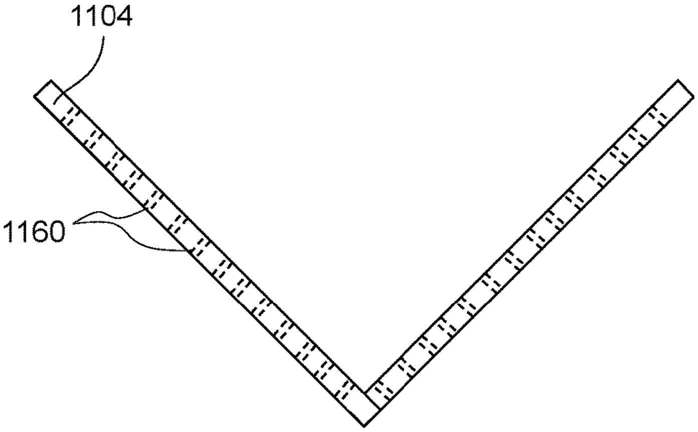
Figure 11E:
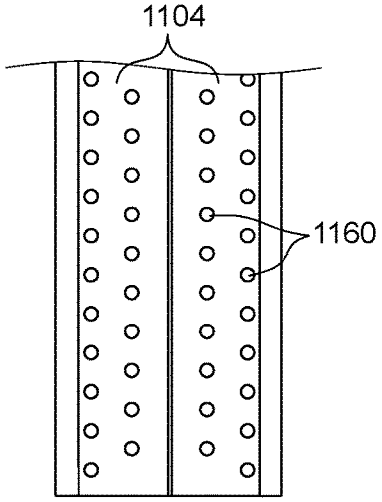
FIGS. 11E and 11F are top-view diagrams of the respective pairs of slats of FIGS. 11C and 11D, according to embodiments.
Figure 11F:
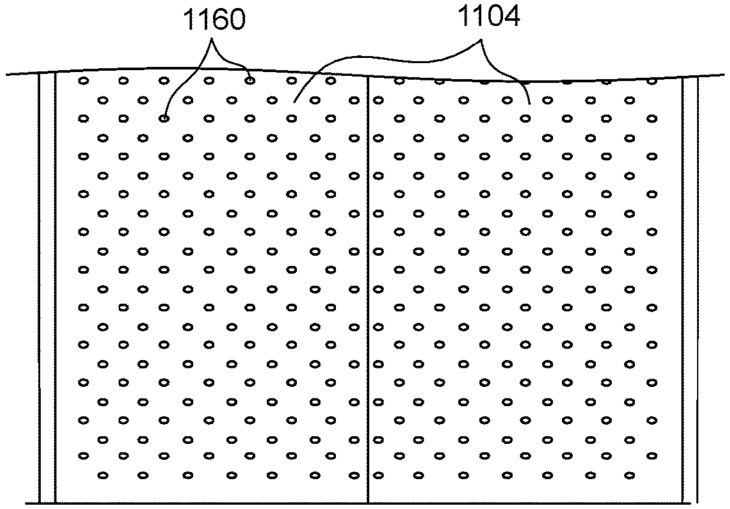

In some embodiments the slats 1104 may include a plurality of slots, holes, or perforations forming openings 1160 through the slats 1104. FIGS. 11C-11D are cross-sectional diagrams of respective pairs of slats forming a V-gutter having such openings 1160. FIGS. 11E and 11F are top-view diagrams of the respective pairs of slats of FIGS. 11C and 11D, according to embodiments. In some embodiments, e.g., as shown in FIGS. 11C, 11E, openings 1160 may be formed parallel to a flow axis of the mixture of fuel and oxidant. In other embodiments openings 1160 may be formed, e.g., as shown in FIGS. 11D, 11F, perpendicular to a face of the slat 1204. Such openings 1160 may counteract premature combustion by reducing flow resistance of the V-gutters and/or may affect flow of the mixture of fuel and oxidant around the V-gutters formed by the pairs of slats 1104.

Figure 12A:
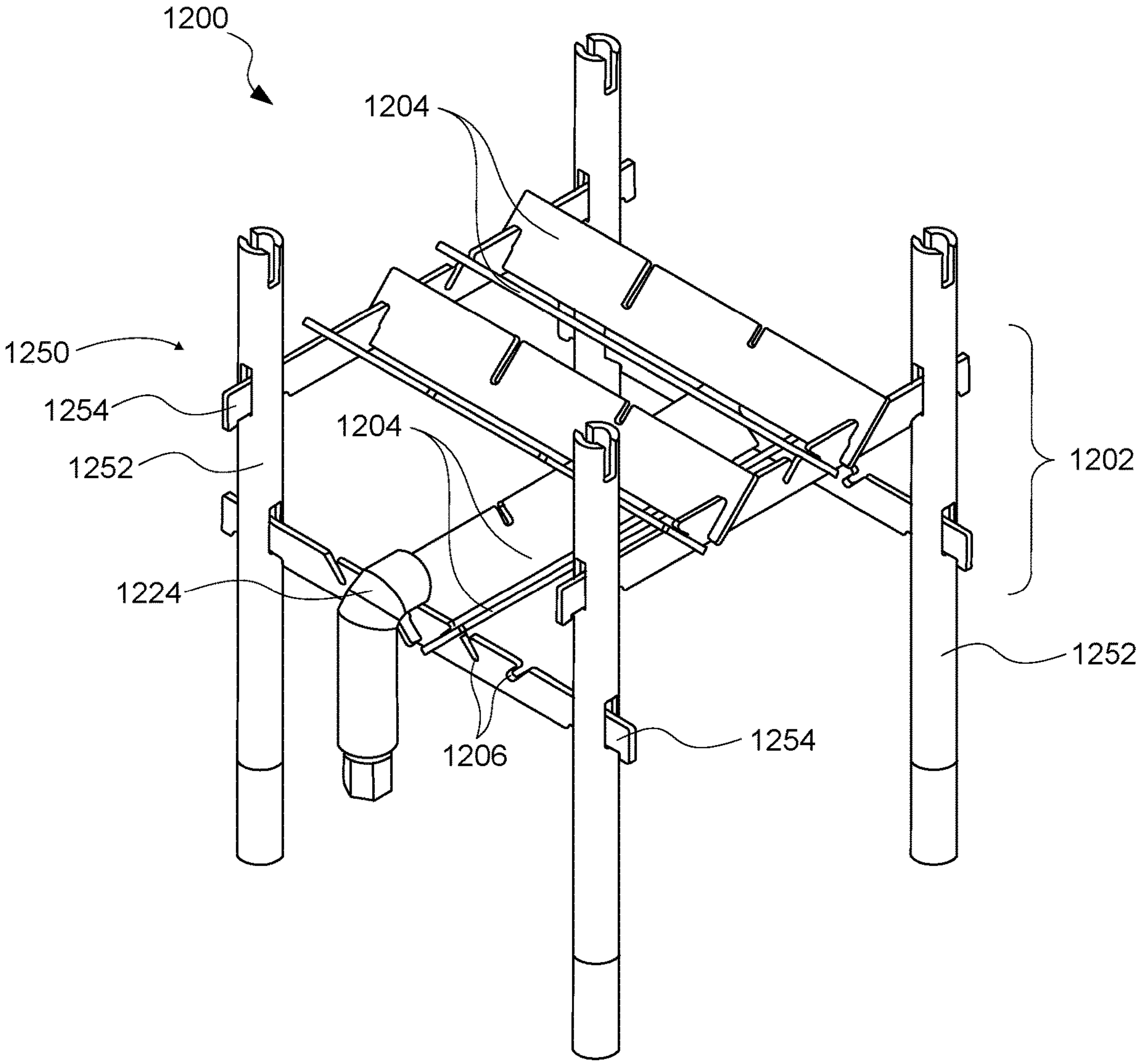
FIG. 12A is a perspective view of a portion of a burner system illustrating a distal flame holder, according to an embodiment.
Figure 12B:
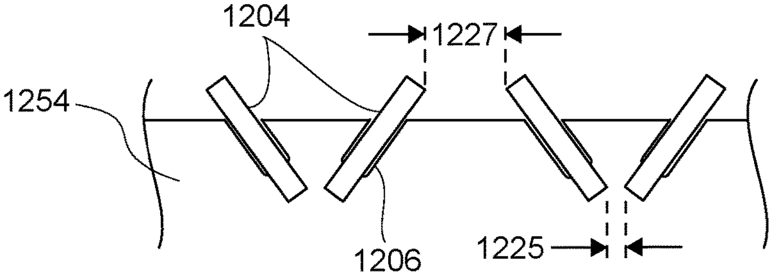
FIG. 12B is a partial end view of a distal flame holder of FIG. 12A, according to an embodiment having one or more pairs of slats.

Though not shown in FIGS. 11A and 11B, the flame holder 1102 includes a support structure configured to hold the slats 1104. FIGS. 12A-12B illustrate implementations using the V-oriented slats 1104.

FIG. 12A is a perspective view of a portion of a combustion system 1200 illustrating a distal flame holder 1202 of FIG. 12A (corresponding with, e.g., flame holders 1102, 502 described above), according to an embodiment. Cross members 1254 may be disposed between pairs of support legs 1252 and may be formed to support the distal flame holder 1202. The distal flame holder 1202 may include one or more pairs of slats 1204 (corresponding to slats 1104 described above). According to an embodiment the cross members 1254 may include slots 1206 to receive the slats 1204. The slats may be formed from silicon carbide or, alternatively, zirconia. Each of the one or more pairs of slats 1204 may be oriented in a V-shape as described with respect to FIG. 11 and disposed longitudinally across the support structure 1250. In some embodiments the distal flame holder 1202 may include multiple layers of slats 1204. For example, FIG. 12A shows two layers of slats 1204. Those having skill in the art will recognize that fewer or more layers of slats 1204 may be employed without departing from the disclosure. According to an embodiment multiple sets of slots 1206 may be included in each cross-member 1254 to permit varying the distance 1227 between pairs of slats 1204 at different levels of the slats 1204. In some embodiments, at least one layer of slats may be disposed upstream from a pilot burner 1224 such that a mixture of fuel and oxidant is affected by the first layer of slats 1204.

FIG. 12B is a partial end view of the distal flame holder 1202 according to an embodiment having one or more pairs of slats 1204. The cross members 1254 may include one or more slots 1206 arranged to hold, at an end position of the slats, pairs of the slates 1204 in a V-arrangement. Alternatively, a cross member 1254 may include V-shaped cut-outs configured to hold an end of a pair of the slats 1204. In some embodiments, each pair of slats 1204 forming the V-shaped trough may include a gap 1225 between the bottom longitudinal edges of the slats 1204 (i.e., the edges nearest a fuel and oxidant source). Alternatively, or additionally, in some embodiments one or more pairs of slats 1204 may be arranged so that the gap 1225 is minimized or eliminated, as shown in FIGS. 11C, 11D. For example, the cross member 1254 may be formed so that the bottom edges of the slats 1204 are in contact along their length. In another implementation, as shown in FIGS. 11E, 11F, the bottom edge of one slat 1204 may form a joint with the bottom edge of the other slat 1204 in a pair of the slats 1204 forming a V-gutter. In embodiments including plural pairs of the slats 1204, the V-shaped cut-outs may be spaced a distance 1227 between upper longitudinal (i.e., downstream) edges of the slats 1204. As described regarding FIG. 11, the channel thus formed between two pairs of slats 1204 is wide at the bottom and narrow at the top, such that a combustion reaction of the fuel and oxidant occurs primarily within the combustion channel. Flue gases or uncombusted fuel and oxidant exit the combustion channels 1108 at the narrower apertures at the top of the slats 1104. At least one of the gap(s) 1225 and the space(s) 1227 permit flow of the first gas mixture 104 therethrough. The cross members 754 may alternatively include v-shaped recesses onto which pairs of slats 723 may be laid. In such embodiments, no gap 723 is required.

Figure 13A:
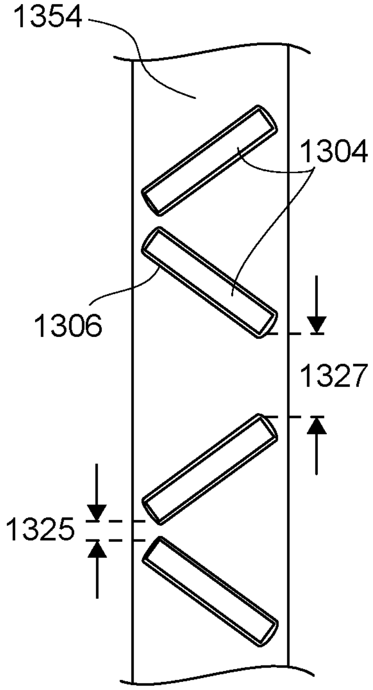
FIG. 13A is a partial end view of a distal flame holder, according to an embodiment.

While FIGS. 12A-B illustrate embodiments in which the slats are oriented for a vertical flow of fuel and oxidant, those having skill in the art will recognize that other orientations are within the scope of the disclosure. For example, FIG. 13A is a partial end view of a distal flame holder 1302, according to an embodiment, in which slats 1304 are oriented horizontally to form V-gutters and thus horizontal combustion channels in a vertical plane. In such embodiment the slats 1304 may be secured by cross members 1354 that include securing through-slots where slats 1304 may be inserted through the slots 1306. Each V-gutter formed by a pair of slats 1304 may form a gap 1325 at the bottom of the V, and each V-gutter pair may be separated from another pair by a space 1327.

Figure 13B:
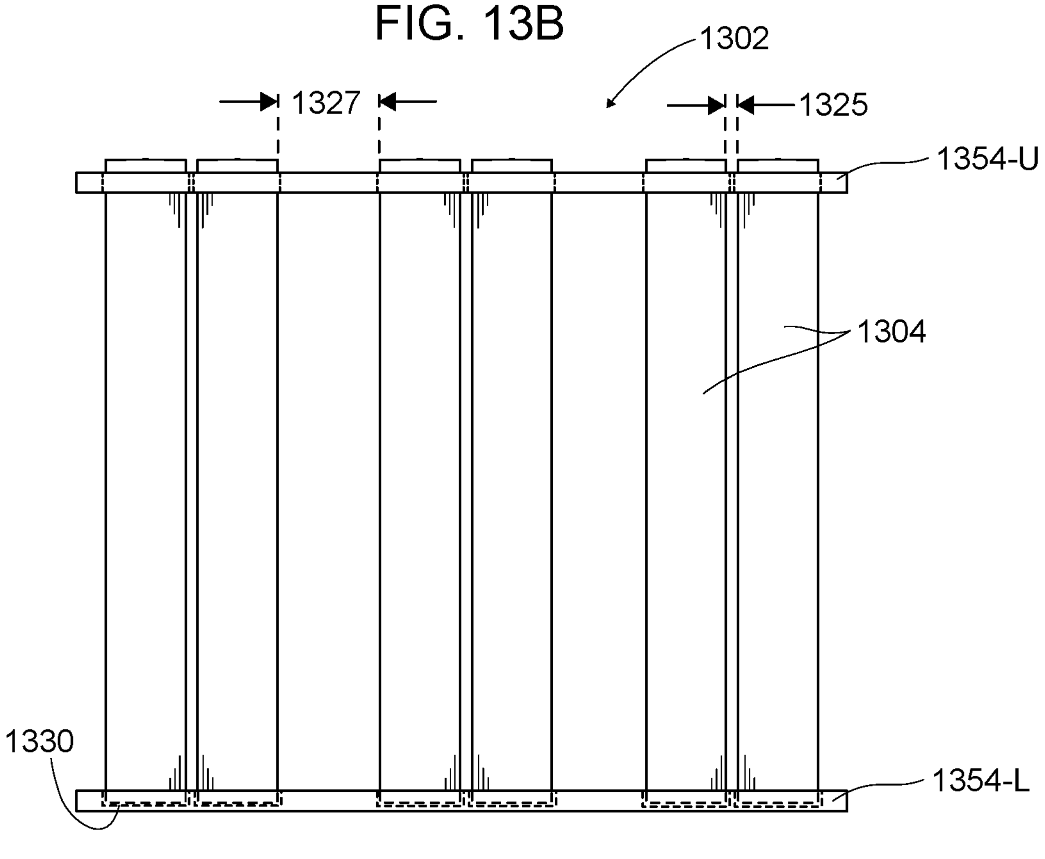
FIG. 13B is a front view from downstream of a flamer holder, according to an embodiment.

FIG. 13B is a front view from downstream of a flamer holder 1302, according to an embodiment. In FIG. 13B, slats 1304 may be oriented vertically to form a vertical plane of combustion channels. The slats 1304 may be secured by an upper cross member 1354-U having slots to receive each slat 1304, while a lower cross member 1354-L may include a depression or channel 1330 formed to receive an end of each respective slat 1304 such that the corresponding slat stands in the depression or channel 1330 without passing through the corresponding lower cross member 1354-L. Those having skill in the art will recognize that other methods of securing slats 1304 in different orientations within the scope of the disclosure.

A combustion system including the flame holder 1102, 1202, 1302 may include a fuel and oxidant source configured to output fuel and oxidant; and a flame holder 1102, 1202, 1302. The flame holder 102, 1202, 1302 may include a plurality of slats 1104, 1204, 1304 arranged to be longitudinally parallel with each other, respective pairs of the slats 1104, 1204, 1304 each forming a v-shaped channel. Each slat 1104, 1204, 1304 may include a first edge proximal to the fuel and oxidant source and a second edge distal from the fuel and oxidant source. The combustion system may further include a support structure 1250 holding the slats 1104, 1204, 1304. A plurality of combustion channels 1108 may be defined by the pairs of slats 1104, 1204, 1304, each combustion channel disposed between respective adjacent pairs of slats. Each combustion channel 1108 may have a tapered cross-sectional shape defined by a wider width corresponding to a distance between the respective first edges of adjacent pairs of slats 1104, 1204, 1304 and a narrower width corresponding to a distance between the respective second edges of the adjacent pairs of slats 1104, 1204, 1304. Each combustion channel 1108 may have a length corresponding to a distance between a plane defined by the first edges and a plane defined by the second edges of the plurality of slats. The length may be at least five times the narrower width. The flame holder 1102, 1202, 1302, may be positioned to receive the fuel and oxidant into the combustion channels 1108 and to collectively hold a combustion reaction of the fuel and oxidant primarily within the combustion channels 1108.

According to an embodiment, a first slat 1104, 1204, 1304 and a second slat 1104, 1204, 1304 of each of the pairs of slats may be separated at their respective first edges by a first, non-zero distance and may be separated at their respective second edges by a second distance. The first distance may be smaller than the second distance. According to an embodiment, the fuel and oxidant source 101 may include one or more fuel nozzles (not shown) oriented to expel fuel substantially about a fuel and oxidant flow axis. The flow axis may generally be defined as a main flow volume from the fuel nozzle(s) to the flame holder. The flame holder may be disposed distal to the one or more fuel nozzles.

Each respective pair of the slats may be separated from a neighboring pair of the slats by a distance, according to an embodiment. The distance separating one pair of slats from another pair of slats maybe greater than the (first non-zero) distance separating the first edges of the slats within each pair.

The support structure 1250 may include at least two first cross members 1254 disposed parallel to each other on a first plane and having one or more pairs of first slots 1206 each holding a first end region or an opposite end region of a respective slat 1204, each pair of the first slots 1206 being formed at predetermined angles with respect to a flow axis of the combustion system to form a "V" shape. According to an embodiment, the support structure 1250 may include one or more layers of slats 1204 and corresponding cross members. For example, the support structure 1250 may include at least two second cross members disposed parallel to each other along a second plane that is separated, along the flow axis, from the first plane and having one or more pairs of second slots 1206 each configured to hold a first end region or an opposite end region of a respective slate 1204, each pair of the second slots 1206 being formed at predetermined angles with respect to the flow axis of the combustion system. The support structure may include a plurality of pairs of second slots 1206 each holding an opposite end region of a respective slat 1204. Each pair of the second slots 1206 may be formed at the predetermined angles with respect to the flow axis of the combustion system to form a "V" shape. In some embodiments, the support structure may include a first support structure portion that includes the first slots and a second support structure portion that includes the second slots.

According to an embodiment, the combustion system 1200 may include a floor (such as floor 505, 605) and a wall. The floor and the wall together may define an enclosure (such as enclosure 503, 603), and the flame holder 1202 may be positioned within the enclosure. The support structure 1250 may be coupled to the wall (as illustrated in FIG. 5) or, in other embodiments, to the floor 605 (as illustrated in FIG. 6).

The support structure 1250 may include at least two cross members 1254 disposed a horizontal distance from each other and having at least one pair of closed through-slots (not shown) sized to surround and hold respective end regions of the slats 1204.

According to another embodiment, in a horizontal combustion system (e.g., a horizontal version combustion system 1200 in FIG. 12A) the support structure 1250 may include at least two cross members disposed a vertical distance from each other. In such horizontal embodiment, the at last two cross members 1254 may include an upper cross member 1354-U and a lower cross member 1354-L. The upper cross member 1354-U may include at least one pair of closed through-slots sized to receive and hold respective end regions of the slats 1304, while the lower cross member 1354-L may have at least one pair of depressions in which respective slats 1304 stand.

Figure 14:
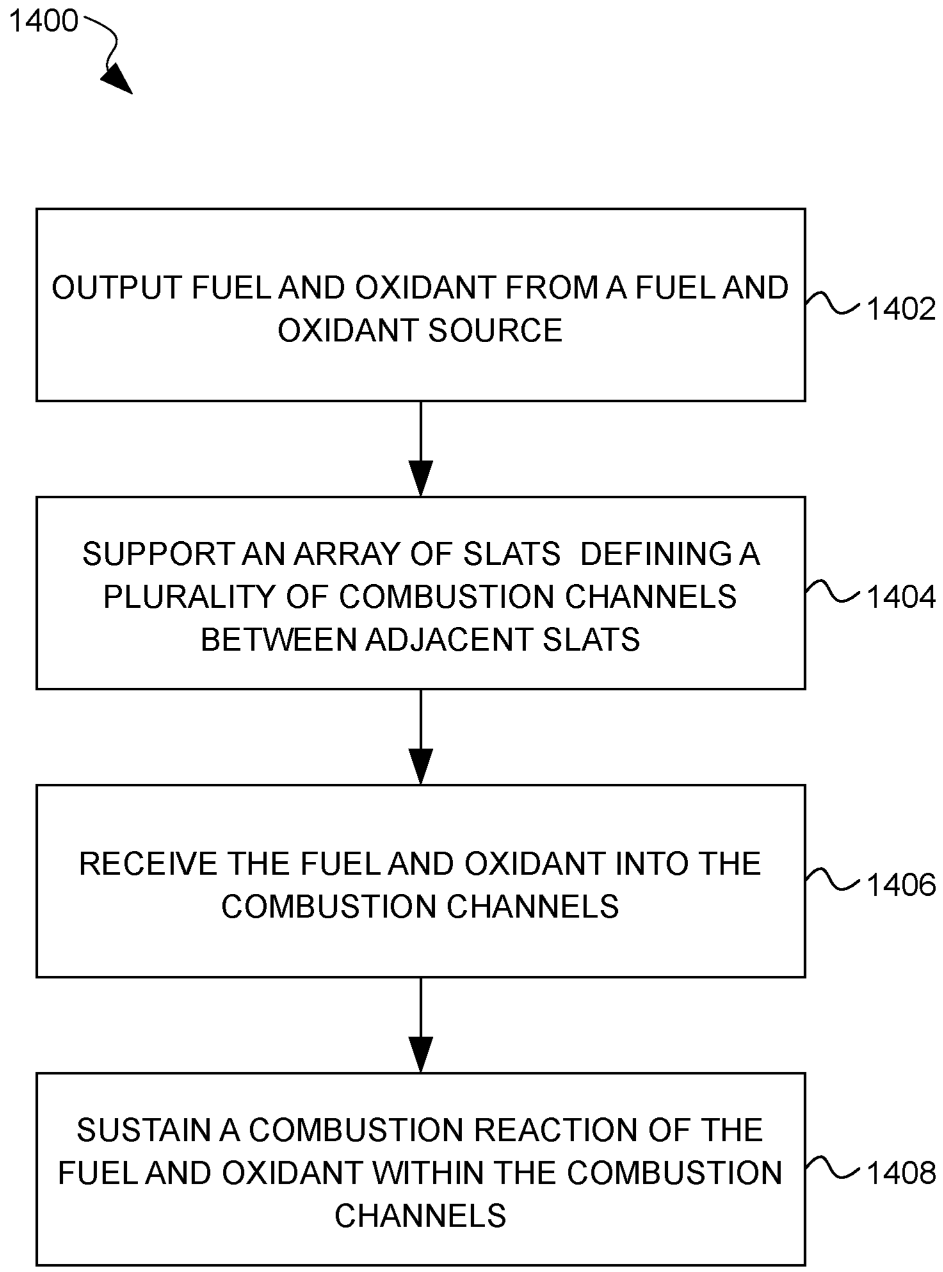
FIG. 14 is a flow diagram of a process for operating a combustion system, according to an embodiment.

FIG. 14 is a flow diagram of a process 1400 for operating a combustion system according to an embodiment. At 1402, the process outputs fuel and oxidant from a fuel and oxidant source. At 1404, the process includes supporting a plurality of slats of a flame holder, arranged longitudinally parallel to each other in pairs each forming a v-shaped channel. Each slat may include a first edge proximal to the fuel and oxidant source and a second edge distal from the fuel and oxidant source. Slats may define a plurality of combustion channels each disposed between respective adjacent v-shaped channels formed by the pairs of slats. Each combustion channel may have a tapered cross-sectional shape defined by a wider width of the combustion channels corresponding to a distance between respective first edges of adjacent slats and a narrower width corresponding to a distance between the respective second edges of the adjacent pairs of slats. A height (also referenced herein as "length") of the combustion channels may correspond to a distance between a plane defined by the first edges of the slats and a plane defined by the second edges of the plurality of slats along an axis corresponding to a general direction of output of the fuel and oxidant, the height being at least five times the width. At 1406, the process receives the fuel and oxidant into the combustion channels. At 1408, the process sustains a combustion reaction of the fuel and oxidant within the combustion channels.

According to an embodiment, the process 1400 may include heating at least a subset of the slats to a threshold temperature prior to holding the combustion reaction of the fuel and oxidant within the combustion channels.

According to an embodiment, the supporting of the slats at 1404 of the process 1400 may include supporting each slat in a respective slot of a support structure.

According to an embodiment, outputting the fuel and the oxidant from the fuel and oxidant source may include expelling fuel from one or more fuel nozzles (not shown; e.g., of a fuel and oxidant source). The nozzles may be oriented and configured to expel the fuel in a fuel and oxidant flow direction. Supporting the slats may include supporting the flame holder a predetermined distance distal to the one or more fuel nozzles in the fuel and oxidant flow direction. The fuel and oxidant flow direction may be defined as a direction from the fuel nozzle(s) toward the flame holder having the slats.

According to an embodiment, the support structure may include at least two cross members disposed parallel to each other along a first plane and each having one or more pairs of the respective slots. Supporting each slat in a respective slot of a support structure may include supporting respective end regions of each pair of slats in corresponding respective slots of the respective cross members.

According to an embodiment, supporting the slats may include suspending the slats between a first support structure portion and a second support structure portion. In some embodiments, suspending the slats may include holding a respective first end portion of each pair of slats in a respective first pair of slots of the first support structure portion and holding a respective second end portion of each pair of slats in a respective second slot of the second support structure portion. In some instances, the first and second support structure portions may be fixed to a floor of a furnace. In other instances, the first and second support structure portions may be fixed to a (non-floor) wall of a furnace.

According to an embodiment the slats supported in the process 1400 may have a rectangular cross-section. Consequently, the slats may have straight (linear walls).

According to an embodiment, each slat may include a refractory material. For example, the refractory material may include (but is not limited to) Mullite, Cordierite, silicon carbide, zirconia, fused quartz, and/or fiber reinforced cementatious material.

According to an embodiment, the slats may be oriented to maintain a narrowest width of the combustion channels to be greater than a quench distance of the combustion reaction.

According to an embodiment, pairs of slats may be oriented or arranged to cause the width of each combustion channel between adjacent pairs of the slats to be tapered in a continuous manner along the length of the combustion channel. That is, the length from a fuel input plane of the flame holder to a fuel output plane of the flame holder comprised of the slats may be a continuous taper.

According to an embodiment, the process 1400 may include preheating the slats to an auto-ignition temperature of the fuel and oxidant prior to receiving the fuel and oxidant into the combustion channels.

According to an embodiment the process 1400 may include supporting a pilot flame upstream, downstream, or impinging upon the slats to hold a combustion reaction within the combustion channels.

According to an embodiment, the process 1400 may include igniting the fuel and oxidant upstream of the combustion channels.

According to an embodiment, a combustion system (e.g., combustion system 500, 600 described above) may include a fuel and oxidant source configured to output fuel and oxidant, and a flame holder (e.g., 502, 602). The flame holder may include a plurality of non-cylindrical elongated members arranged to be longitudinally parallel with each other, as discussed above with respect to FIG. 8. (For example, but not limited to, slats 904, 1004, 1104.) Each elongated member may have at least a first surface, a second surface and first and second ends. A first set of the elongated members, when viewed from a first end, may have their first surfaces inclined toward the fuel and oxidant source relative to a flow of the fuel and oxidant. (For example, the right-side slats 1104 in each "V" in FIG. 11A.) A second set of the elongated members when viewed from the first end may have their first surfaces oppositely inclined toward the fuel and oxidant source relative to the flow of the fuel and oxidant. (For example, the left-side slats 1104 in each "V" in FIG. 11A.) That is, the incline of the first set of elongated members may be opposite to the incline of the second set of elongated members.

Each elongated member of the first set of elongated members may respectively be disposed adjacent to a respective elongated member of the second set of elongated members such that respective pairs of the elongated members from the first set and the second set each form a v-shaped channel.

Each elongated member may have a first edge proximal to the fuel and oxidant source, and a second edge distal from the fuel and oxidant source. A support structure may hold the elongated members as described supra. The support structure may support the flame holder a predetermined distance distal to the fuel and oxidant source, where the fuel and oxidant source may include one or more fuel nozzles that are configured and oriented to expel fuel in a fuel and oxidant flow direction. For example, the fuel and oxidant flow direction may be defined generally as the direction from the fuel and oxidant source (including the nozzles) toward the flame holder and may be bounded by a volume defined by, e.g., a furnace wall.

Combustion channels (e.g., 908, 1008, 1108) are formed between respective adjacent pairs of the elongated members, and each combustion channel may have a cross-sectional shape defined by a wider width corresponding to a distance between the respective first edges of adjacent pairs of elongated members and a narrower width corresponding to a distance between the respective second edges of the adjacent pairs of elongated members. A length (e.g., "L" in FIG. 11A) of the combustion channel may correspond to a distance between a first plane defined by the first edges and a second plane defined by the second edges of the plurality of elongated members. The length may be at least five times the narrower width. The flame holder may be positioned to receive the fuel and oxidant into the wider width of the combustion channels and to collectively hold a combustion reaction of the fuel and oxidant primarily within the combustion channels.

Those having skill in the art will acknowledge that features disclosed with respect to combustion systems described above (e.g., 100, 500, 600), disclosed flame holders, elongated members, and slats may be combined with the features of the combustion system described immediately above to the extent they are not inconsistent. The inventors have contemplated each such combination.

According to an embodiment, the second surfaces of each elongated member in each pair of the elongated members may define a longitudinal cavity between the first and second planes that opens away from the fuel and oxidant source. For example, the inside of each "V" in FIG. 11A is a cavity defined by each pair of slats 1104.

According to an embodiment, each pair of the elongated members may be disposed to form a longitudinal gap between the first edges of the elongated members of the pair, the gap being narrower than the cavity between the second edges of the elongated members of the pair. For example, each pair forming a "V" in FIG. 11A includes a gap at the bottom. Those having skill in the art will recognize that the gap may be a consequence of the support structure configuration, and may be minimized or eliminated in some embodiments.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustion system, comprising:
- a fuel and oxidant source configured to output fuel and oxidant; and
- a flame holder including:
  - a plurality of slats arranged to be longitudinally parallel with each other, respective pairs of the slats each forming a v-shaped channel, each slat having:
    - a first edge proximal to the fuel and oxidant source; and
    - a second edge distal from the fuel and oxidant source;
  - a support structure holding the slats; and
  - a plurality of combustion channels each between respective adjacent pairs of slats, each combustion channel having a tapered cross-sectional shape defined by a wider width corresponding to a distance between the respective first edges of adjacent pairs of slats and a narrower width corresponding to a distance between the respective second edges of the adjacent pairs of slats and having a length corresponding to a distance between a plane defined by the first edges and a plane defined by the second edges of the plurality of slats, the flame holder being positioned to receive the fuel and oxidant into the combustion channels and to collectively hold a combustion reaction of the fuel and oxidant primarily within the combustion channels;
  - wherein a first slat and a second slat of each of the pairs of slats are separated at their respective first edges by a first, non-zero distance and are separated at their respective second edges by a second distance, the first distance being smaller than the second distance.

2. The combustion system according to claim 1, wherein the fuel and oxidant source includes one or more fuel nozzles oriented to expel fuel substantially about a fuel and oxidant flow axis, and
- the flame holder is disposed distal to the one or more fuel nozzles.

3. The combustion system according to claim 1, wherein each respective pair of the slats is separated from a neighboring pair of the slats by a third non-zero distance.

4. The combustion system according to claim 3, wherein the third non-zero distance is greater than the first non-zero distance.

5. The combustion system of claim 1, wherein the support structure includes at least two first cross members disposed parallel to each other on a first plane and having one or more pairs of first slots each holding a first end region or an opposite end region of a respective slat, each pair of the first slots being formed at predetermined angles with respect to a flow axis of the combustion system to form a "V" shape.

6. The combustion system of claim 5, wherein the support structure includes at least two second cross members disposed parallel to each other on a second plane that is separated, along the flow axis, from the first plane and having one or more pairs of second slots each configured to hold a first end region or an opposite end region of a respective slat, each pair of the second slots being formed at predetermined angles with respect to the flow axis of the combustion system.

7. A combustion system, comprising:
- a fuel and oxidant source configured to output fuel and oxidant; and
- a flame holder including:
  - a plurality of slats arranged to be longitudinally with each other, respective pairs of the s each forming a v-shaped channel, each slat having:
    - a first edge proximal to the fuel and oxidant source; and
    - a second edge distal from the fuel and oxidant source;
  - a support structure holding the slats; and
  - a plurality of combustion channels each between respective adjacent pairs of slats, each combustion channel having a tapered cross-sectional shape defined by a wider width corresponding to a distance between the respective first edges of adjacent pairs of slats and a narrower width corresponding to a distance between the respective second edges of the adjacent pairs of slats and having a length corresponding to a distance between a plane defined by the first edges and a plane defined by the second edges of the plurality of slats, the flame holder being positioned to receive the fuel and oxidant into the combustion channels and to collectively hold a combustion reaction of the fuel and oxidant primarily within the combustion channels,
- wherein the support structure includes a plurality of pairs of first slots each holding a first end region of a respective slat, each pair of the first slots being formed at predetermined angles with respect to a flow axis of the combustion system to form a "V" shape.

8. The combustion system of claim 7, wherein the support structure includes a plurality of pairs of second slots each holding an opposite end region of a respective slat, each pair of the second slots being formed at the predetermined angles with respect to the flow axis of the combustion system.

9. The combustion system of claim 8, wherein the support structure includes:
- a first support structure portion including the first slots; and
- a second support structure portion including the second slots.

10. The combustion system of claim 1, further comprising:
- a floor; and
- a wall, the floor and the wall together defining an enclosure, the flame holder being positioned within the enclosure.

11. The combustion system of claim 10, wherein the support structure is coupled to the wall.

12. The combustion system of claim 11, wherein the support structure includes at least two cross members disposed a horizontal distance from each other and each having at least one pair of closed through-slots sized to surround and hold respective end regions of the slats.

13. The combustion system of claim 11, wherein the support structure includes at least two cross members disposed a vertical distance from each other.

14. The combustion system of claim 13, wherein an upper cross member of the at least two cross members having at least one pair of closed through-slots sized to receive and hold respective end regions of the slats, and lower cross member of the at least two cross members having at least one pair of depressions in which respective slats stand.

15. The combustion system of claim 11, wherein the support structure is coupled to the floor.

16. The combustion system of claim 7, wherein the slots are rotatable and wherein rotating the slots causes the slats to rotate to change a width or angle of the V in one or more of the pairs of slats.

17. The combustion system of claim 1, further comprising a heater configured to heat the slats to a selected temperature.

18. The combustion system of claim 1, wherein each slat includes a refractory material.

19. The combustion system of claim 18, wherein the refractory material includes one or more of Mullite, Cordierite, silicon carbide, zirconia, fused quartz, and fiber reinforced cementatious material.

20. The combustion system of claim 1, wherein the slats have a shape that maintains a minimum width of the combustion channels greater than a quench distance of the combustion reaction.

21. The combustion system of claim 1, wherein the slats are shaped such that the width of each combustion channel is tapered in a continuous manner along the length of the combustion channel.

22. The combustion system of claim 1, wherein the fuel includes hydrogen.

23. The combustion system of claim 22, wherein the fuel includes a concentration of hydrogen that is variable during operation of the combustion system.

24. A method, comprising:
- outputting fuel and oxidant from a fuel and oxidant source;
- supporting a plurality of slats of a flame holder, the slats being arranged longitudinally parallel to each other in pairs each forming a v-shaped channel, each slat having a first edge proximal to the fuel and oxidant source and a second edge distal from the fuel and oxidant source;
- receiving the fuel and oxidant into a plurality of combustion channels each disposed between respective adjacent v-shaped channels formed by the pairs of slats, each combustion channel having a tapered cross-sectional shape defined by a wider width corresponding to a distance between the respective first edges of adjacent pairs of slats and a narrower width corresponding to a distance between the respective second edges of the adjacent pairs of slats and having a length corresponding to a distance between a plane defined by the first edges and a plane defined by the second edges of the plurality of slats; and
- holding a combustion reaction of the fuel and oxidant primarily within the combustion channels;
- wherein outputting the fuel and the oxidant from the fuel and oxidant source includes expelling fuel from one or more fuel nozzles oriented to expel the fuel in a fuel and oxidant flow direction, and
- wherein supporting the slats includes supporting the flame holder a predetermined distance distal to the one or more fuel nozzles in the fuel and oxidant flow direction.

25. The method of claim 24, comprising heating the slats to a threshold temperature prior to holding the combustion reaction of the fuel and oxidant within the combustion channels.

26. The method of claim 24, wherein supporting the slats includes supporting each slat in a respective slot of a support structure.

27. The method of claim 26, wherein the support structure includes at least two cross members disposed parallel to each other along a first plane and each having one or more pairs of the respective slots, and said supporting each slat in a respective slot of a support structure includes supporting respective end regions of each pair of slats in corresponding respective slots of the respective cross members.

28. The method of claim 24, wherein supporting the slats includes suspending the slats between a first support structure portion and a second support structure portion.

29. The method of claim 28, wherein the suspending the slats includes:
- holding a respective first end portion of each pair of slats in a respective first pair of slots of the first support structure portion; and
- holding a respective second end portion of each pair of slats in a respective second slot of the second support structure portion.

30. The method of claim 29, further comprising fixing the first and the second support structure portions to a floor of a furnace.

31. The method of claim 29, further comprising fixing the first and the second support structure portions to a wall of a furnace.

32. The method of claim 24, wherein the slats have a rectangular cross-section.

33. The method of claim 24, wherein each slat includes a refractory material.

34. The method of claim 33, wherein the refractory material includes one or more of Mullite, Cordierite, silicon carbide, zirconia, fused quartz, and fiber reinforced cementatious material.

35. The method of claim 24, wherein the slats are straight walled slats.

36. The method of claim 24 wherein the slats are oriented to maintain the narrower width of the combustion channels greater than a quench distance of the combustion reaction.

37. The method of claim 24, wherein the pairs of slats are oriented such that the width of each combustion channel between adjacent pairs of the slats is tapered in a continuous manner along the length of the combustion channel.

38. The method of claim 24, further comprising preheating the slats to an auto-ignition temperature of the fuel and oxidant prior to receiving the fuel and oxidant into the combustion channels.

39. A method, comprising:
- outputting fuel and oxidant from a fuel and oxidant source;
- supporting a plurality of slats of a flame holder, the slate being arranged longitudinally parallel to each other in pairs each forming a v-shaped channel, each slat having a first edge proximal to the fuel and oxidant source and a seco distal from the fuel and oxidant source;
- receiving the fuel and oxidant into a plurality of combustion channels each disposed between respective adjacent v-shaped channels formed by the pairs of slats, each combustion channel having a tapered cross-sectional shape defined by a wider width corresponding to a distance between the respective first edges of adjacent pairs of slats and a narrower width corresponding to a distance between the respective second edges of the adjacent pairs of slats and having a length corresponding to a distance between a plane defined by the first edges and a plane defined by the second edges of the plurality of slats;

holding a combustion reaction of the fuel and oxidant primarily within the combustion channels; and supporting a pilot flame upstream, downstream, or impinging upon the slats to hold the combustion reaction within the combustion channels.

40. The method of claim 24, further comprising igniting the fuel and oxidant upstream from the combustion channels.

41. A combustion system, comprising:

a fuel and oxidant source configured to output fuel and oxidant; and a flame holder including:

a plurality of non-cylindrical elongated members arranged to be longitudinally parallel with each other, each elongated member having at least a first surface and a second surface and first and second ends, a first set of the elongated members when viewed from a first end thereof having the first surfaces of the first set of the elongated members inclined toward the fuel and oxidant source relative to a flow of the fuel and oxidant, a second set of the elongated members when viewed from the first end thereof having the first surfaces of the second set of elongated members inclined toward the fuel and oxidant source relative to the flow of the fuel and oxidant, the incline of the first set of elongated members being opposite the incline of the second set of elongated members, each elongated member of the first set of elongated members respectively being disposed adjacent to a respective elongated member of the second set of elongated members such that respective pairs of the elongated members from the first set and the second set each form a v-shaped channel, each elongated member having:

a first edge proximal to the fuel and oxidant source; and a second edge distal from the fuel and oxidant source;

a support structure holding the elongated members; and a plurality of combustion channels each between respective adjacent pairs of elongated members, each combustion channel having a cross-sectional shape defined by a wider width corresponding to a distance between the respective first edges of adjacent pairs of elongated members and a narrower width corresponding to a distance between the respective second edges of the adjacent pairs of elongated members and having a length corresponding to a distance between a plane defined by the first edges and a plane defined by the second edges of the plurality of elongated members, the length being at least five times the narrower width, the flame holder being positioned to receive the fuel and oxidant into the combustion channels and to collectively hold a combustion reaction of the fuel and oxidant primarily within the combustion channels.

42. The combustion system of claim 41, wherein the second surfaces of each elongated member in each pair of the elongated members may define a longitudinal cavity between the first and second planes that opens away from the fuel and oxidant source.

43. The combustion system of claim 42, wherein each pair of the elongated members may be disposed to form a longitudinal gap between the first edges of the elongated members of the pair, the gap being narrower than the cavity between the second edges of the elongated members of the pair.

44. The combustion system of claim 41, wherein the fuel and oxidant source includes one or more fuel nozzles configured and oriented to expel the fuel in a fuel and oxidant flow direction, and the flame holder is supported a predetermined distance distal to the one or more fuel nozzles.

* * * * *